United States Patent

[11] 3,611,103

| [72] | Inventor | Richard A. Ayers<br>Cajon, Calif. |
|---|---|---|
| [21] | Appl. No. | 748,324 |
| [22] | Filed | July 29, 1968 |
| [45] | Patented | Oct. 5, 1971 |
| [73] | Assignee | Gulf Oil Corporation<br>San Diego, Calif. |

[54] CAPACITOR CHARGING AND DISCHARGING CONTROL SYSTEM
34 Claims, 8 Drawing Figs.

[52] U.S. Cl. ..................................................... 320/1,
323/22
[51] Int. Cl. ..................................................... H03k 6/04
[50] Field of Search ........................................... 320/1;
219/113, 114, 10, 77; 317/43; 323/8, 22, 24, 34;
321/16; 235/151.11

[56] References Cited
UNITED STATES PATENTS
2,450,614 10/1948 Ringer et al. .................. 219/113

| 2,459,153 | 1/1949 | England ........................ | 320/1 |
|---|---|---|---|
| 2,515,636 | 7/1950 | Dawson et al. ................ | 219/113 |
| 2,515,634 | 7/1950 | Dawson et al. ................ | 219/113 X |
| 3,074,009 | 1/1963 | Dunnabeck et al. ........... | 219/113 |
| 3,414,700 | 12/1968 | Glorioso ....................... | 219/113 X |
| 3,466,527 | 9/1969 | Ping Sun Chun ............. | 323/24 X |

*Primary Examiner*—Terrell W. Fears
*Attorney*—Fitch, Even, Tabin & Luedeka

ABSTRACT: A control system is disclosed for controlling the production of high-magnitude current pulses to a load, such as a magnetic pulse-forming work coil, at high-pulse rates by selectively charging a capacitor bank and then discharging the same through the load, the operation of the system taking place in a predetermined manner. A logic system automatically deactivates the control system in the event that the operation is other than in this predetermined manner, and antiringing circuitry eliminates ringing effects in the load circuit. A low-inductance, high-current damping resistor safely dissipates certain undesirable high-surge currents in the system to provide long component life and high-speed operation.

INVENTOR
RICHARD A. AYERS

CAPACITOR CHARGING AND DISCHARGING CONTROL SYSTEM

The present invention relates to electrical control systems, and more particularly to a control system for effecting and accurately controlling the production and utilization of high-amperage current pulses at high pulse rates.

A method of utilizing high-amperage pulses of current to produce intense magnetic fields for forming a workpiece to various shapes and configurations is disclosed in U.S. Pat. No. 2,976,907, which issued Mar. 28, 1961. In the employment of this method, a source of high energy is provided, generally by a capacitor storage bank, which is abruptly discharged through a forming coil. The high-amperage current pulse supplied to the forming coil generates an intense magnetic field which interacts with a current flow through a workpiece located in the proximity of the coil to produce large repulsive forces therebetween. These forces may then be utilized for forming, swagging, shaping, etc., the workpiece in various manners now known to the art. Such high-amperage pulses are also required in electrohydraulic forming wherein spark discharges or exploding wires are utilized in the forming operation.

These techniques, as well as various other advanced experimental and production operations, necessitate a suitable control system or circuit which is capable of producing the aforementioned high-amperage pulses of current in a controlled fashion. Control systems of this general type commonly employ an ignitron which is connected between the charged capacitor bank and the forming coil to control the capacitor bank discharge through the forming coil to perform the forming operation. Because of the presence of the coil inductance and the capacitance in the circuit, the voltage and current through the coil tends to oscillate with a generally exponentially decreasing or damped amplitude, commonly referred to as "ringing." When this occurs, the reversal of voltage and current polarity across the ignitron causes deterioration of this element. This is believed to be due to trace elements in the molybdenum from the anode which enter the mercury pool of the ignitron on such polarity reversals, and these elements then foul the ignitor operation This prevents the ignitron from thereafter functioning. In addition, the presence of this ringing current causes substantial component heating which tends to prevent rapid pulse operation of these systems.

Accordingly, it is one object of the present invention to provide an improved control system which may be utilized to effect the production of high amperage current pulses at high pulse rates while providing the capability of selective control of the pulse magnitude to control the utilization energy.

It is another object of the present invention to provide an improved control system for effecting the production of rapid, high-magnitude current pulses to a load such as a work coil by means of a controllably fired ignitron, while preventing and dissipating the large reverse polarity voltages and currents which tend to develop across the load, and thereby extending the useful operating life of the ignitron and the other power components employed in the apparatus, including the load.

It is a further object of the present invention to provide an improved high-current, low-inductance power-damping resistor for eliminating the current reversal in the ignitron.

A still further object of the present invention is to provide an improved control system which is particularly adapted to provide high-speed, high-current pulses, while including improved protective circuitry for the load, as well as for the system, itself.

It is still another object of the present invention to provide such a control system wherein the protective circuitry automatically disables the system in the event that a predetermined time sequence of operations involved therein does not properly occur.

It is a further object of the present invention to provide such a control system as aforementioned which is adapted to be controlled by external apparatus suitably programmed for a manufacturing or production operation.

A still further object of the present invention is to provide such a control system as aforementioned which controls the production of high amperage pulses for rapid ignition firing with a minimum of internal stress to the system and a maximum factor of safety and efficiency in operation otherwise not present in the handling of such rapid current surges.

Other objects and advantages of the present invention will become apparent from the following detailed description when considered in conjunction with the accompanying drawings, wherein:

FIGS. 1 through 4, considered together, are a schematic representation of an embodiment of the control system in accordance with the present invention;

Figure 1:
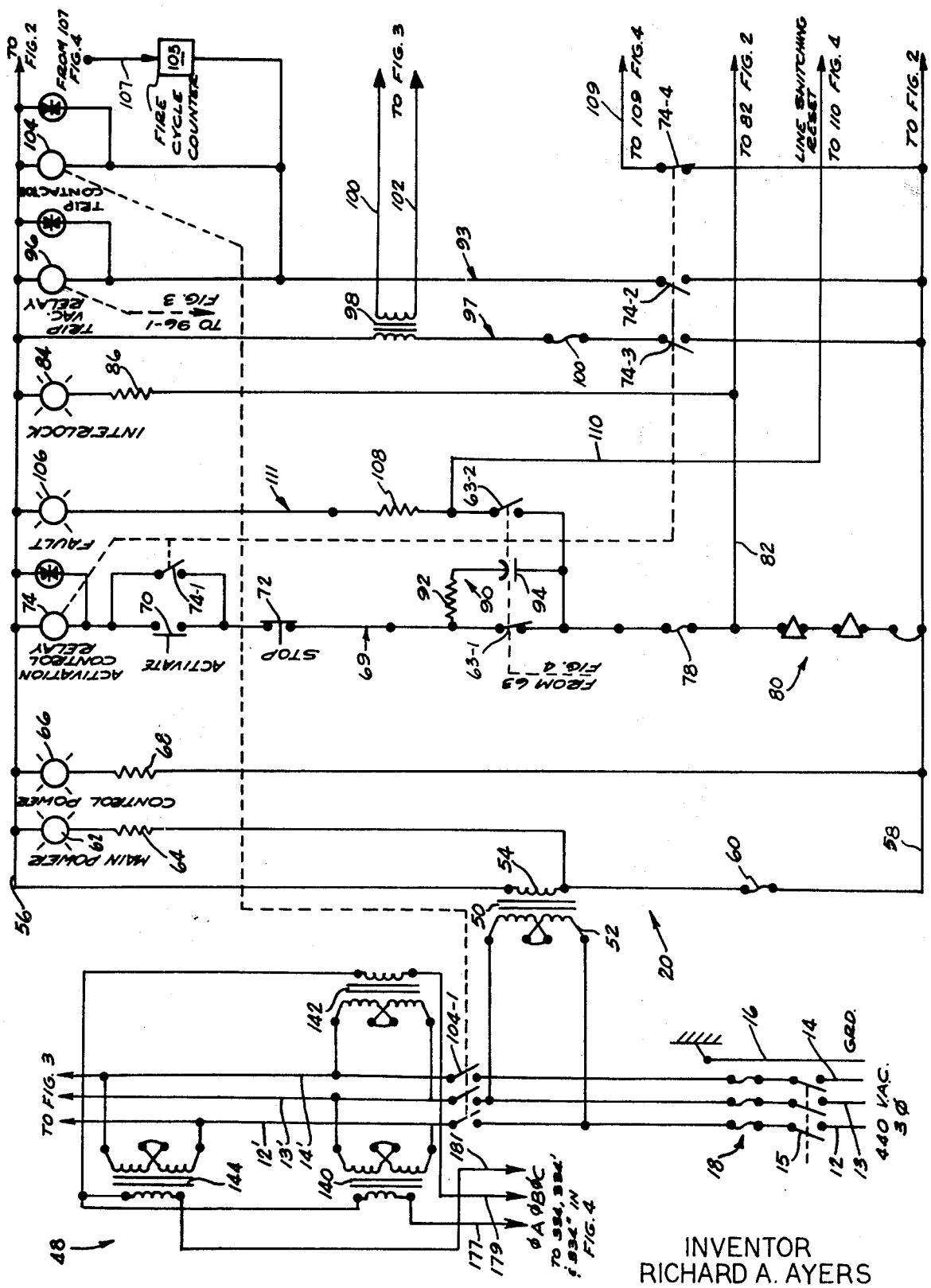

In general, the control system in accordance with the present embodiment of the invention controls the production of high-magnitude current pulses to a load and comprises means for activating the system by applying a power source thereto; high-energy storage capacitor means, such as relatively large capacitor banks; capacitor charging means for regulating the energy buildup on the capacitor banks from the power source; and primary or main switching means such as one or more ignitrons or the like connected between the capacitor banks and the load, and being normally nonconductive to prevent discharge of the capacitor banks to the load, but being adapted for firing in a predetermined or selected manner. The control system also includes logic and control means responsive to given command signals for effecting the operation of the capacitor-charging means and the main switching means for discharging the stored energy to the load in a predetermined manner, the logic means including protective means for automatically deactivating the control system in the event that the operation of the system is other than in this predetermined manner. Antiringing means are provided coupled to the main switching means and across the load for preventing the occurrence of significant reverse polarity voltages across the main switching means and for rapidly dissipating any reverse currents produced by circuit capacitance and the inductive nature of the load, thus permitting high-speed pulsing of the load and substantial elimination of the degradation of the main switching means otherwise produced by such reverse polarity voltages.

Improved resistance means are provided in conjunction with the antiringing means which have high strength, low inductance and high energy dissipation characteristics so that any substantial reverse currents which may be produced are quickly dissipated without damaging the apparatus in which the system is employed, while permitting the system to supply further pulses of energy to the load in rapid succession.

The antiringing means includes auxiliary switching means, which may be in the form of one or more ignitrons, which have a connected polarity opposite to that of the main ignitrons and are coupled to the energy-dissipating resistance means. Main- and auxiliary-pilot-switching means are coupled respectively to the main and auxiliary ignitrons and may be in the form of ignitrons, thyratrons, etc., for appropriately causing the main and auxiliary ignitrons to be in conductive condition.

Trigger circuit means including, for example, a semiconductor-switching device such as a suitable thyristor, may be employed for activating or firing the main- and auxiliary-pilot-switching means in response to a low-energy signal supplied by the logic and control means circuitry.

In addition to the above, the system also includes other protective, safety, and operating features, which are hereinafter described, to control the rapid production of high-magnitude current pulses in a safe and efficient manner, while providing a relatively long life to the switching components employed, and thus achieving reliable and economical operation. This is especially important in automated industrial applications where the system may be employed in automatic magnetic forming processes and the like.

Figure 2:
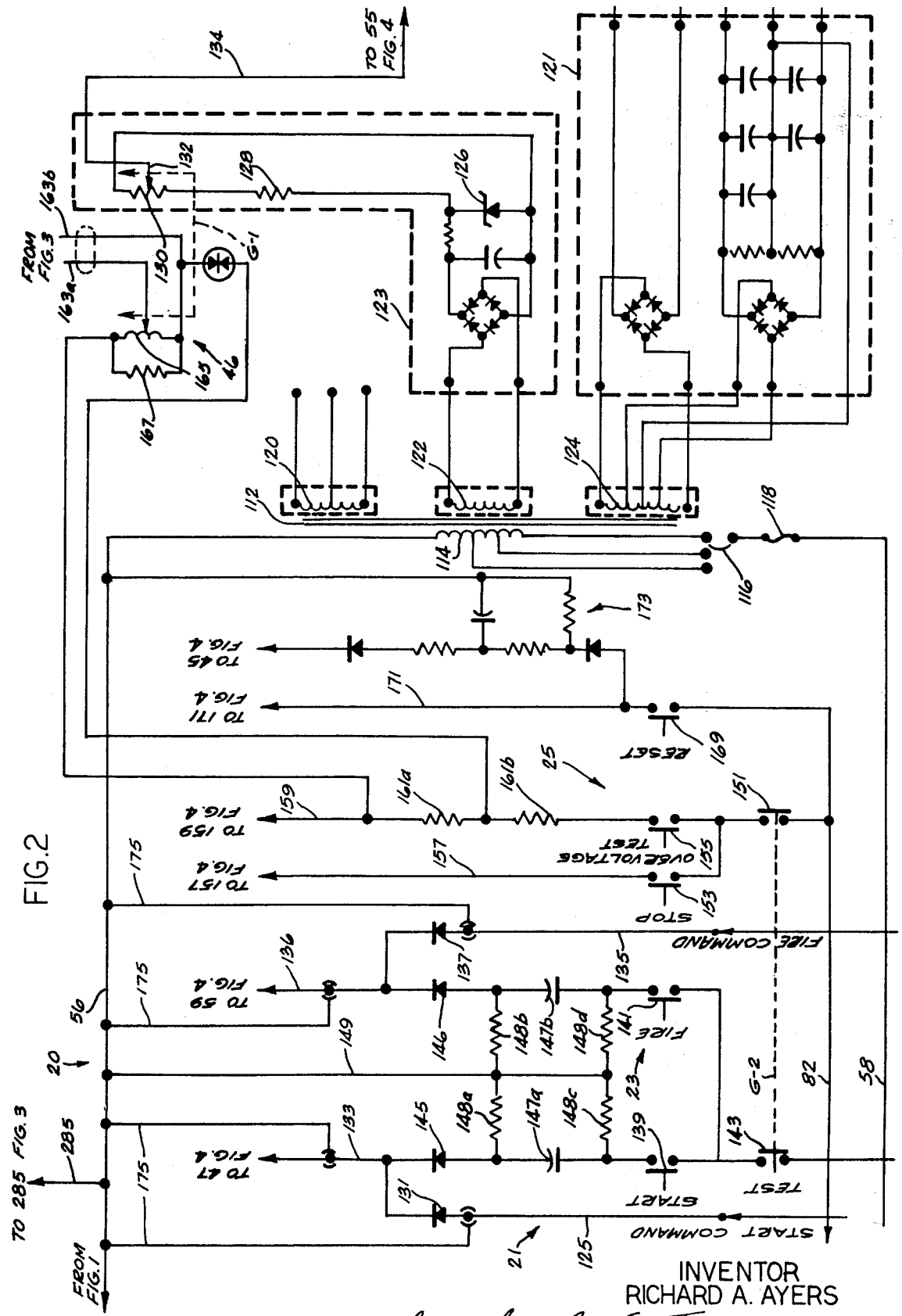
Figure 3:
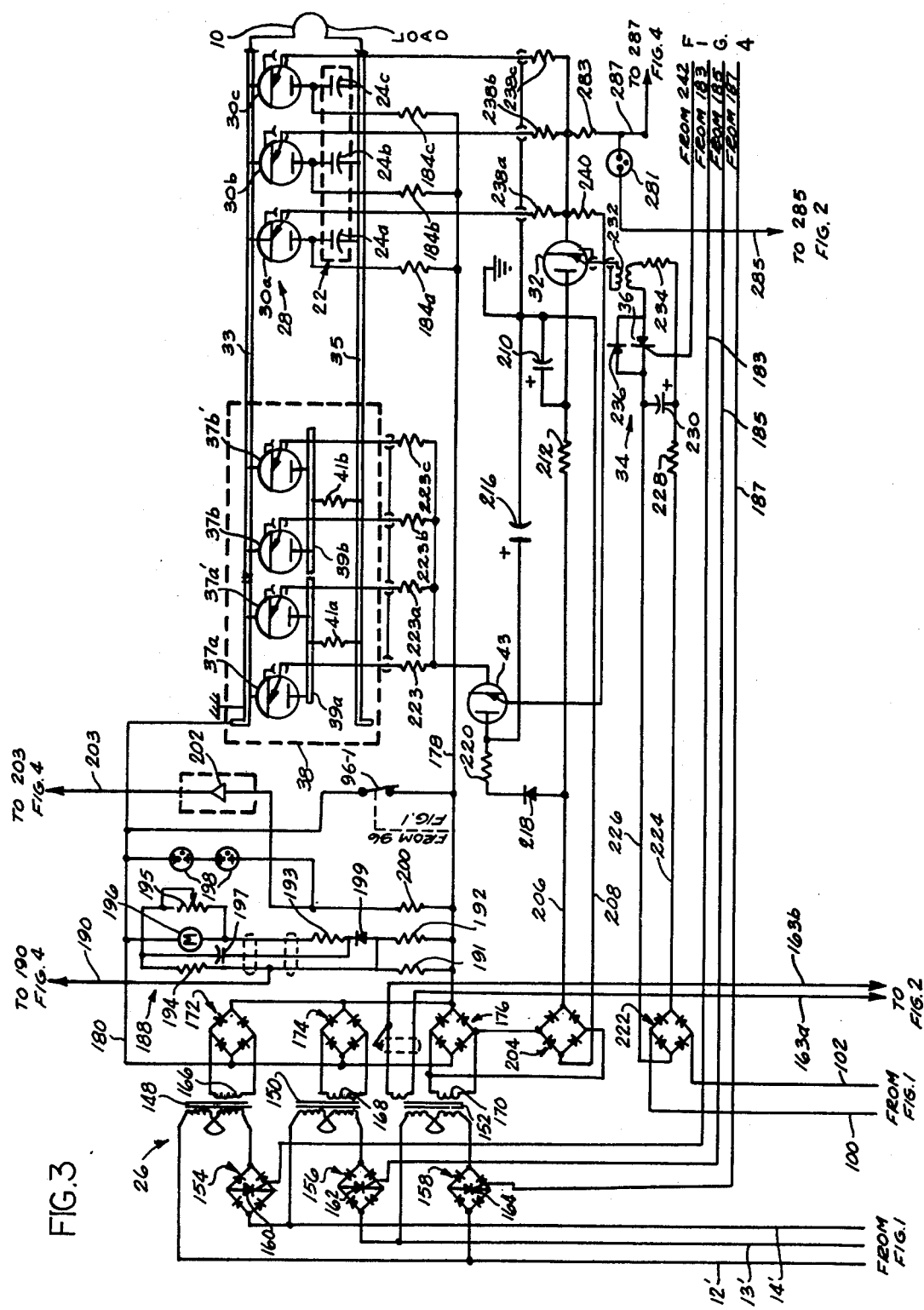

Referring now generally to FIGS. 1 through 4, there is schematically shown a control system for controlling the production of high-magnitude current pulses to a load 10, which is illustrated in FIG. 3 as a low resistance forming or work coil adapted to deliver a high-energy impulse to a workpiece (not shown). The control system is adapted to be connected to an electrical power source, illustrated in FIG. 1 as a 440-volt three-phase AC source on lines 12, 13 and 14, through a three-pole disconnect switch 15 having its contacts or poles serially connected in each respective line, lines 12, 13 and 14 carrying alternating line voltages having phase angles spaced 120° apart. A chassis ground 16 is provided for reasons of safety.

From the three-pole disconnect switch 15, the three-phase source is supplied, through fuses 18, to a number of different circuits of the control system, which will be subsequently described, first more generally, and later in greater detail.

An activation control circuit, generally indicates as 20 in FIGS. 1 and 2, is coupled to the three-phase source across only lines 12 and 13 to pick up a single phase therefrom, and comprises means for activating and deactivating the control system by controllably applying and removing the power source to and from the system. The activation control circuit 20 includes generally two parts. The first part is shown in FIG. 1 and comprises the principal system-activating control relays and power indicating lamps, while the second part is shown in FIG. 2 and comprises START command signal input circuit 21 which either receives and retransmits an externally generated START signal, or generates such a signal internally and manually, for initiating the charging of the storage capacitor means; FIRE command signal input circuit 23 which either receives and retransmits an externally generated FIRE signal, or generates such a signal internally and manually, for causing the discharge of the storage-capacitor means to the load; and TEST, STOP and RESET command signal circuits 25. The activation control circuit 20 also includes various low voltage power supplies for supplying the necessary power to other control circuits of the system, as will be later described.

High energy storage capacitor means 22, illustrated in FIG. 3 as the bank of capacitors 24a, 24b, 24c, etc. is coupled to a capacitor charging circuit means, indicated generally as 26 in FIG. 3, which regulates the energy buildup on the capacitor means 22 from the three-phase source on lines 12', 13' and 14' (which extend from lines 12, 13 and 14 in FIG. 1) in such a manner that the power from each line is separately switched to successively apply the power from each line in a predetermined manner. In this connection, the capacitor charging circuit means 26 includes transformers which apply each phase to a rectifier circuit which then supplies the charging current to the capacitor means 22, and each of the three phase lines are switched ON when their respective AC voltages are such as to provide minimum current surges and stresses in the transformers. In particular, each voltage phase is applied when it is at its peak value and switched OFF when it is at zero, in a manner to be hereinafter described.

Main switching means 28, illustrated as a plurality of ignitrons 30a, 30b, 30c, etc., are connected between the capacitor means 22 and the load 10, and are normally nonconductive to prevent discharge of the capacitor means 22 to the load 10 unless and until an appropriate signal is provided thereto from a normally nonconductive pilot switching means 32, also illustrated as an ignitron. The pilot-switching means 32 activates the main switching means 28 so that the latter switches to its conductive condition so as to appropriately discharge the capacitor means 22 to the load 10. The load 10 and each series connected main ignitron and storage capacitor 30a-24a, 30b-24b, etc., are connected as parallel branches across first and second buses 33 and 35.

Trigger circuit means 34 is coupled to the pilot-switching means 32 for rendering the same conductive in response to the given signal, and may include a thyristor device such as a silicon controlled rectifier 36 which, in turn, is triggered by a low-energy signal from the logic and control circuitry of FIG. 4 in a manner to be later described. When this occurs, reverse voltages of substantial magnitude tend to develop across the load and across the series connected main ignitrons 30 and capacitors 24, resulting from a ringing effect caused by the effective load inductance and circuit capacitance. Antiringing means 38 is coupled across the buses 33 and 35, and consequently across the series connected switching means 28 and capacitor means 22, in parallel with load 10, and damps or prevents the occurrence of significant reverse voltages across the main ignitrons, whereby the aforementioned rapid deterioration of the ignitrons is substantially eliminated. The antiringing means 38 generally comprises auxiliary ignitrons 37a, 37a', 37b, 37b', connected in parallel pairs across the first bus 33 and auxiliary buses 39a and 39b, respectively. Each pair of auxiliary ignitrons is then connected to the second bus 35 through respective high-energy-dissipating resistors 41a and 41b, each having a construction in accordance with a further aspect of the present invention, hereinafter to be described in detail. The auxiliary ignitrons 37 are paired with respect to each series resistor 41 to effectively lower the current and power loading on each circuit combination.

An auxiliary pilot-switching means, shown as an additional ignitron 43, is coupled to the auxiliary ignitrons 37 of the antiringing means 38 for placing them into a conductively enabled or operative condition (i.e., so that they will conduct upon receiving a proper polarity potential across their power terminals) in response to the triggering of the main pilot switching means 32, and at essentially the same time that the latter is triggered by the trigger circuit means 34.

Figure 4:
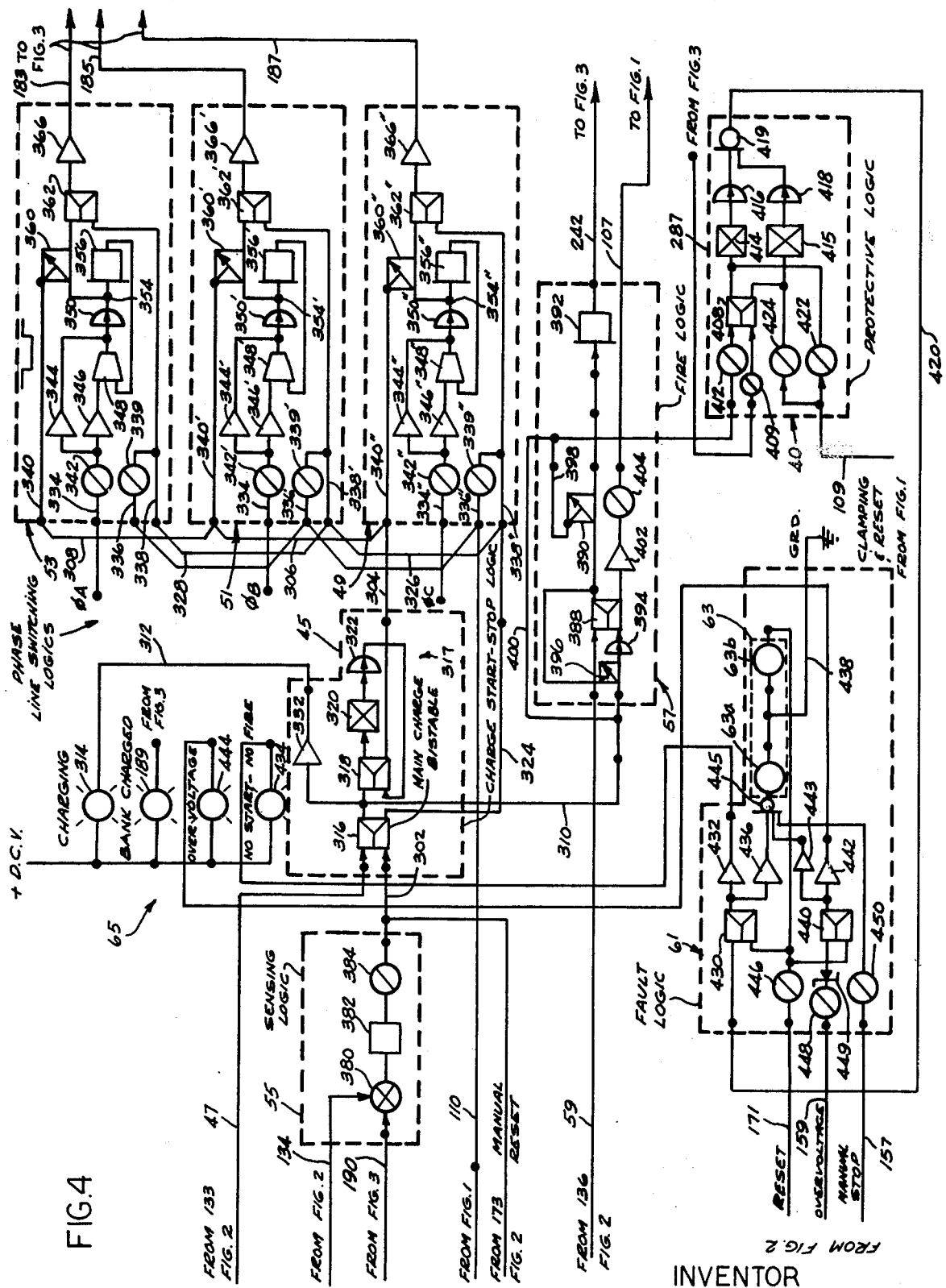

Logic and control means, generally illustrated in FIG. 4, is included in the control system, which is responsive to given command signals for effecting the general overall system operation, and primarily the operation of the capacitor charging circuit means 26 and the main switching means 28, controlling the charging and discharging of the stored energy in a predetermined manner and deactivating the system if its manner of operation is otherwise. The logic means comprises, inter alia, protective means including protective logic 40 for automatically deactivating the control system in the event that system operation is other than in the predetermined manner. In general, the logic means of FIG. 4 includes means responsive to a first or START command signal from the activating control means 20 (FIG. 2) for starting the charging cycle, i.e., causing the capacitor charging means 26 to initiate the energy buildup, and the protective means includes means for deactivating the control system in the event that the START command signal fails to occur within a predetermined time after the system is activated. Means are also included which are responsive to a second or FIRE command signal from the activating control means 20 for commencing the firing cycle, i.e., causing the main switching means 28 to become conductive, discharging the capacitor means 22 to the load 10, and the aforementioned protective means includes means for deactivating the control system in the event that this second or FIRE signal fails to occur within a second predetermined time after the START command signal occurs, as well as in the event that there is a failure of the main switching means to fire within a predetermined time after the START command.

Considering the logic and control means of FIG. 4 with somewhat greater particularity, the logic and control means comprises charge start-stop logic 45 which is responsive to the START command signal on lead 47 from the START command input circuit 21 (FIG. 2) and provides a suitable gating signal to each of three line-switching logic circuits 49, 51 and 53 which, in turn, cause the capacitor charging circuit means 26 (FIG. 3) to commence charging the storage capacitor means 22 from the three-phase source by turning on one phase at a time at the maximum amplitude or peak voltage points of each phase, whereby minimum stresses are produced within the transformers of the capacitor-charging means 26, as will subsequently be explained.

The charge start-stop logic 45 is also responsive to a CHARGE COMPLETE signal from a sensing logic 55 to then cause the line-switching logics 49, 51 and 53 to stop the charging cycle cooperation. The sensing logic 55 compares a voltage proportioned to the voltage on the storage capacitor means 22 with an adjustable reference voltage supplied by the reference circuit 123 (FIG. 2), and provides the CHARGE COMPLETE signal to the start-stop logic 45 when a preset or given relationship exists indicating that the desired or preselected amount of energy is stored in the capacitor means 22. That is, sensing means 55 is responsive to the energy level of the capacitor means 22 and provides an output indicative that the energy level therein has reached a preselected value which then effects discontinuance of the energy build-up through the charge start-stop logic 45, the line-switching logics 49, 51 and 53, and the capacitor charging circuit 26.

The charge start-stop logic 45 supplies its gating signal to each of the line-switching logics 49, 51 and 53 simultaneously for only a certain period of time, typically 50 ms., and during this period of time each of the line-switching logics must, if at all, generate a line-switching signal. Otherwise, after this period has elapsed, the gating signal from the start-stop logic prevents any outputs or line-switching signals from being supplied to the capacitor charging circuit 26, and the capacitor means 22 does not develop any charge buildup.

The line-switching signals of each of the line-switching logics are generated with reference to the separate AC phase voltages applied respectively to each line-switching logic at the terminals A, B and C, corresponding to each of the phase applied to the respective transformers of the capacitor charging circuit 26, and are derived from phase-separating transformers 48, shown in FIG. 1, and later described in greater detail. Each of the line-switching logics include a phase shifter which generates a phase shifter pulse at 90° from the respective AC phase voltage points of each phase voltage.

A fire logic circuit 57 is provided which is responsive to the FIRE command signal on lead 59 from the FIRE command signal input circuit 23 (FIG. 2) for generating a firing signal which is applied to the trigger circuit 34 (FIG. 3), triggering the SCR 36, and causing the firing of the main and auxiliary pilot switching means 32 and 43 and the main switching means 28, respectively. The fire logic 57 serves as a buffer between the apparatus producing the external FIRE command signal and the control system, and is coupled back to the charge start-stop logic 45 to receive a clamping signal therefrom so that no firing signal can be produced by the fire logic 57 until the energy of the capacitor means 22 has reached the preselected value; that is, until the CHARGE COMPLETE signal has been supplied from the sensing logic 55 to the charge start-stop logic 45, and the charging cycle has been completed.

Protective logic 40, the general functions of which have already been described, is responsive to the state of the charge start-stop logic 45 and to the condition of the pilot ignitrons, and provides an appropriate output signal to a fault logic circuit 61 in the event that the predetermined timing sequence does not occur. Fault logic 61 is interconnected with the system-activating control circuit 20 (FIG. 1) through deactivating control relay 63, in a manner to be subsequently described, to deactivate the control system in response to an appropriate output from the protective logic 40. In addition, the fault logic 61 is also responsive to the signals from the TEST, STOP and RESET circuits 25 (FIG. 2), as well a to an OVERVOLTAGE signal provided by an overvoltage protective circuit means, generally illustrated as 46 in FIG. 2.

The overvoltage protective circuit 46, through the fault logic 61, deactivates the system in the event that the energy level of the capacitor bank 24 becomes greater than a further or second preselected value, which may be somewhat higher than the first-mentioned preselected value at which the charging cycle is to be normally stopped by the generation of the CHARGE COMPLETE signal from the sensing logic 55. The overvoltage protective circuit 46 has an independent energy-sensing device, to be described hereinafter, which senses the voltage buildup on the capacitor bank and deactivates the system in the event that the sensing logic 55 fails to stop or discontinue the charging cycle so that the voltage does not become excessive for the particular load employed, or for the ratings of the capacitor bank. This prevents inadvertent or accidental damage to the load or to the apparatus. The adjustment for selecting the overvoltage signal supplied to the fault logic 61 and the adjustment for selecting the energy reference signal supplied to the sensing logic 55 may be ganged together so as to maintain any desired relationship between them, as shown by G–1 in FIG. 2.

The general state of the system is presented to an operator by the indicator lamps 65 in FIG. 4, as well as those shown in FIG. 1.

Turning now to the construction of the present embodiment of the invention in detail, as shown in FIG. 1, the system activation control circuit 20 comprises a power supply transformer 50 having its primary winding 52 connected across lines 12 and 13 of the three-phase source and its secondary winding 54 providing a 115 volt single AC supply across the activation control circuit supply leads 56 and 58, the transformer 50 being protected by a serially connected secondary winding fuse 60. A "main power" signal lamp 62 is connected directly across the secondary transformer winding 54 in series with a voltage-dropping resistor 64 to provide an indication that the main power to the system in ON. The activation control circuit comprises a plurality of parallel branches connected across the supply leads 56 and 58, each of which performs a particular function or functions which will now be described.

A "control power" signal lamp 66 is connected across the secondary winding 54 and the fuse 60 through a voltage dropping resistor 68, forming the first branch across supply leads 56 and 58, and provides an indication that power is being supplied to the system activation that power is being supplied to the system activation control circuit. Thus, both lamps 62 and 66 are normally lighted or ON whenever the disconnect switch 15 is in its closed condition, applying power to the activation control circuit power supply transformer 50, and the "control power" lamp will go out in the event that the fuse 60 is blown, indicating that no power is being supplied to the activation control circuit 20.

The next parallel branch to the right, as shown in FIG. 1, is branch 69 which includes a normally open activate switch 70 and a normally closed Stop switch 72. These switches 70 and 72 are connected in series with a primary or activating control relay coil 74, a normally closed deactivating control relay contact set 63–1 which is controlled by the fault logic circuit 61 (FIG. 4) and opens under certain given conditions previously mentioned, fuse 78 and interlocks 80. The interlocks 80 are provided in the various cabinet members and other protective enclosures, etc., and prevents the system from being activated in the event that the cabinet or other necessary protective portions of the apparatus are not properly closed or connected. A safety AC supply lead is thus connected to the controlled side of the interlocks 80 which provides power to light an "interlock" lamp 84 serially connected to the control side of the interlocks safety supply lead 82 through a voltage dropping resistor 86, and the safety supply lead 82 then extends to the test and manual reset circuits 25, generally shown in FIG. 2. A contact protector circuit 90 is connected across the normally closed deactivating control relay contacts 63–1, and is formed by series-connected resistor 92 and capacitor 94.

The activating control relay 74 has three sets of normally open contacts 74-1, 74-2, 74-3, and one set of normally closed contacts 74-4. More particularly, latching contacts 74-1 are connected across the activate switch 70, and when the activate switch 70 is momentarily closed, the activating control relay 74 is energized and will latch itself ON and remain ON until the branch 69 is opened. This may occur either by the opening of the stop switch 72, the opening of the deactivating control relay contacts 63-1, the blowing of fuse 78, or by the opening of any of the interlocks 80.

The second set of normally open activating control relay contacts 74-2 is serially connected in branch 93 with trip vacuum relay coil 96 which has normally closed contacts 96-1 shown in FIG. 3, normally maintaining a short circuit across the capacitor-charging circuit 26 so that any charge on the capacitor bank 22 will be conducted to ground. In addition, a trip contactor coil 104 is connected in parallel with the trip vacuum relay coil 96 and is energized whenever the latter relay is energized. The trip contactor 104 has a three-pole contact set 104-1 which is normally open, and each pole is connected in series with the three lines 12, 13 and 14 of the three-phase AC source. Upon closure of the three-pole contact set 104-1, the three-phase line voltage is applied to the remaining circuits of the system, which are to be hereinafter described.

Also energized by the activating relay contacts 74-2 is a cycle counter 105 which is responsive to signals from the fire logic 57 (FIG. 4) via lead 107 for registering the number of times a firing signal has been transmitted to the trigger circuit means 34 (FIG. 3). Thus, the counter 105 counts the number of current pulses generated at load 10, and the number of firing cycles occurring.

The third set of normally open activating control relay contacts 7-3 is serially connected in branch 97 with trigger circuit power supply transformer 98 through a fuse 100. The secondary winding of the transformer 98 supplies power to the trigger circuit means 34 (FIG. 3) via leads 100 and 102 to preenable this circuit for triggering the pilot switching means 32 under the appropriate conditions.

The normally closed activating relay contact set 74-4 couples the supply lead 58 via lead 109 to the protective logic circuit 40 (FIG. 4) and provides a clamping and reset signal therefor which normally prevents the operation thereof. This signal keeps the timers in the protective logic set at zero until the activating control relay 74 is energized by the pressing of the activate switch 70, which then removes the clamping and reset signal through the opening of 74-4, and permits the protective logic 40 to begin timing the functions of the control system, as previously mentioned.

The activating control circuit 20 additionally comprises a subbranch 111 which is connected across the activating control circuit supply leads 56 and 58 through the interlocks 80 and fuse 78 in branch 69, and includes a "fault" indicating lamp 106 serially connected with a voltage-dropping resistor 108 and a set of normally open contacts 63-2 of the deactivating control relay 63 of the fault logic 61 (FIG. 4). On suitable energization of the deactivating control relay 63, the contact set 63-2 is closed, lighting the "fault" indicator lamp 106 and, in addition, providing an automatic reset signal output on lead 110 which is supplied from the controlled side of the contact set 63-2 to the line-switching logics 49, 51 and 53 (FIG. 4) to reset these circuits in preparation for subsequent reactivation of the system and a new charging cycle.

Connected also across the activating control supply leads 56 and 58 is a logic and reference voltage power supply transformer 112 shown in FIG. 2, having its primary winding 114 connected across the supply leads 56 and 58 in series with a tap change loop 116 and a fuse 118 for safety and protective purposes. The transformer 112 has three secondary windings 120, 122 and 124. Secondary windings 120 and 124 provide the necessary voltages to operate the logic circuits illustrated in FIG. 4 and any other generally low-voltage-type devices of the system not otherwise supplied, the latter winding 124 feeding rectifier and filters 121 of conventional type to provide appropriate power outputs, as necessary or desired.

The secondary winding 122 of transformer 112 provides the power source for an adjustable charge-level reference means 123 which is adjusted to preselect the energy level buildup on the capacitor means 22 at which the charging is to be discontinued or stopped to end or complete the charging cycle. Reference means 123 provides the selected reference output as an adjustable voltage level to an input of the sensing logic 55 (FIG. 4) which compares this voltage level with a voltage proportional to the voltage on the capacitor bank 22 to provide a CHARGE COMPLETE signal to the charge start-stop logic 45 when the preselected energy level has been reached, as previously mentioned. The charge-level reference means 123 comprises a conventional full-wave rectifier bridge connected to the secondary winding 122, a filter capacitor and resistor, and a reference Zener diode 126 which applied a DC voltage output across a resistance potentiometer formed by series connected resistors 128 and 130. The resistor 130 is variable and has a wiper 132 which is adjusted for preselection of the energy level of the storage capacitor bank 22 at which the charging thereof is discontinued in the normal operation of the control system, and the voltage on the wiper 1322 is supplied via lead 134 to the sensing logic 55, shown in FIG. 4.

The activating control circuit 20 also includes the START command and FIRE command input circuits 21 and 23, respectively, as well as the manual TEST, STOP and RESET circuit 25, as shown in FIG. 2. More particularly, START command circuit 21 comprises an input lead 125 which receives a START command signal from external apparatus which may be programmed to control a complete industrial operation in an automatic fashion, this signal being in the form of a pulse 129 as shown in FIG. 5p. The START input lead 125 is coupled through steering diode 131 to lead 133 which is connected to the charge start-stop logic 45 (FIG. 4) through lead 47. A FIRE command input lead 135 is coupled to lead 136 through steering diode 137, and receives a FIRE command signal from external programming apparatus, such signal being in the form of a pulse 138, as shown in FIG. 5q. FIRE output lead 136 is coupled to the FIRE logic 57 (FIG. 4) through lead 59.

Momentary START and FIRE switches 139 and 141 are provided for manually starting the charging cycle and manually firing the stored charge to the load, principally for testing the system, and a TEST toggle switch 143 applies a DC voltage to both the START and FIRE switches 139 and 141 so that upon depressing either switch a suitable pulse is transmitted to the proper output lead 133 or 136 through either steering diode 145 or 146. A pulse shaping and isolation circuit is formed by capacitors 147a and 147b and by resistors 148a, 148b, 148c and 148d which are respectively connected between the START and FIRE switches and their respective steering diodes, and this circuit is referenced to the activation control circuit supply lead 56 via lead 149 connected thereto, as shown in FIG. 2.

The TEST toggle switch 143 is ganged to a further switch 151, shown by G-2, which applies an AC voltage to momentary STOP and OVERVOLTAGE TEST switches 153 and 155. The STOP switch is coupled via lead 157 to the fault logic 61 (FIG. 4) and by applying this voltage thereto, the control system will be deactivated. The OVERVOLTAGE TEST switch 155 simulates an overvoltage condition of the storage-capacitor means 22 as regards the fault logic 61 and also deactivates the system through the fault logic 61 to which it is coupled via lead 159 and series voltage dropping resistors 161a and 161b.

The overvoltage reference means 46 is also connected to lead 159 and is thereby coupled to the fault logic 61. The overvoltage reference means 46 receives an AC voltage on leads 163a and 163b indicative of the voltage on the capacitor means 22 from an auxiliary secondary charging transformer winding of capacitor charging circuit 26 and applies this voltage to a variable autotransformer 165 which has a loading resistor 167 connected thereacross. The variable autotransformer 165 permits the preselection of a given maximum voltage level of the capacitor means 22 and is ganged via G-1 to the variable resistor 130 of the voltage reference means 123 so that if, for some reason, the storage-capacitor means 22 continues to charge after the voltage reference has been reached, an AC voltage of suitable value will be produced by the autotransformer 165 and fed to the fault logic 61 (FIG. 4) so that the system will be deactivated. Normally, some differential or margin may be provided between the voltage reference for merely discontinuing the charging cycle in normal system operation and the overvoltage reference for deactivating the control system.

A manual reset switch 169 is connected to the activating control system AC supply lead 82 and provides an AC manual RESET signal via lead 171 to the fault logic 61 for resetting the same and for resetting the deactivating control relay 63. A DC RESET signal is also supplied in this manner to the charge start-stop logic 45 by means of the rectifier and filter arrangement 173 to reset this logic in the event that no READY signal was supplied by the sensing logic 55.

A number of thyrectors are connected across the relay coils of the activation control circuit 20, and in the overvoltage circuit 46, as shown, for the purpose of transient suppression and to maintain safe voltage levels on the system in accordance with well-known techniques for these purposes. In addition, certain of the leads are desirably shielded and the shields are electrically connected to a common reference, as shown by leads 175 in FIG. 2, to prevent the command pulses from being induced in other circuits of the system where they may result in the malfunctioning thereof.

To summarize now the operation or functioning of the activation control circuit 20, this circuit is energized directly by the closing of disconnect switch 15 which lights the "main power" indicator and the "control power" indicator as well as the "interlock" indicator if all interlocks are closed, and power is applied to the logic and reference voltage power supply to energize these circuits, placing them in a standby condition. Upon momentarily depressing the activate switch 70, the system activation control relay 74 is latched in, energizing the power supply for the trigger circuit means 34 so that the pilot- and auxiliary-pilot-switching means 32 and 43 may be made conductive at the appropriate time without delay, and the trip vacuum relay 96 and trip contactor 104 are energized, respectively opening the circuit across the storage capacitor means 22, and applying the three-phase source voltage to the phase-separating or line-switching transformers 48 and the capacitor charging circuit 26. Additionally, the activating control relay 74 unclamps the protective logic 40, shown in FIG. 4, to permit the timing of the system operations to commence.

Turning now to the detailed description of the remainder of the system, and referring to FIG. 1, the closure of the three-pole contact set 104-1 of the trip contactor 104 applies the three-phase source to leads 12', 13' and 14', and are continuations of leads 12, 13 and 14 from the main. Line-switching transformers 140, 142 and 144 are each respectively connected across the lines 12'-13', 13'-14' and 12'-14' in a delta to Y-configuration to supply three separate low-voltage single-phase AC outputs on leads 177, 179 and 181, supplying phases A, B and C to the phase line-switching logics 49, 51 and 53, illustrated in FIG. 4, to properly control the operation of the capacitor charging circuit 26 for starting and stopping the charging of the capacitor bank, and for charging the bank with minimum internal stress generation in the charging circuit, as described below.

The three-phase source leads 12', 13' and 14' supply the current to the capacitor-charging circuit 26, illustrated in FIG. 3. More particularly, each of the lines are fed to separate charging circuit transformers 148, 150 and 152 through their primary windings which are each coupled to their respective line in a delta configuration through series connected controllable switching means 154, 156 and 158. Since each of the controllable switching means 154, 156 and 158 are serially connected between each of the charging circuit transformers and the source, they may controllably permit or prevent the charging of the capacitor means 22 from each individual phase of the source. The phase control line-switching logics 49, 51 and 53 of FIG. 4 have their respective outputs 183, 185 and 187 coupled to the controllable switching means 154, 156 and 158 for causing them to be conductive or ON at the peak voltage points and nonconductive or OFF at the zero voltage points of the AC from each of their respective voltage phases A, B and C. In this manner, current is supplied to each transformer when the rate of change of magnetic flux in each is minimum, which prevents high-surge currents that would tend to force the windings and transformer structures apart.

Each of the controllable switching means 154, 156 and 158 comprises a full wave rectifier bridge having a thyristor, such as silicon controlled rectifiers 160, 162 and 164, interconnected across the center thereof so as to form a switch in the primary winding of each of the charging transformers 148, 150 and 152, as illustrated in FIG. 3.

Each of the charging circuit transformers 148, 150 and 152 has its secondary winding 166, 168 and 170 connected to parallel full wave bridge rectifiers 172, 174 and 176, each having the positive terminal thereof connected in parallel to capacitor-charging supply lead 178 and the negative terminal thereof connected in parallel to a common or reference lead 180 which is connected to the first bus 33 and to ground. The capacitor-charging supply lead 178 charges the storage capacitor bank 22, and particularly, each of the capacitors 24a, 24b and 24c through current limiting resistors 184a, 184b and 184c. Each of the capacitors has its other terminal connected to the second bus 35. The load 10 is connected across the buses 33 and 35, and the main ignitrons 30a, 30b and 30c are each connected in series between the positive side of the capacitors and the grounded bus 33, normally being nonconductive so as to prevent the charge buildup on the capacitor bank from discharging through the load 10.

By maintaining one side of the load and the bus 33 at ground potential, the hazard to personnel in the proximity of the apparatus is substantially reduced. In addition, although the normally closed trip vacuum relay set 96-1 is necessarily open whenever the control system is activated, at all other times it is of course closed, so that the other supply lead 178 of the charging circuit 26 is shorted directly to ground. The capacitor bank is thus also connected to ground through the current limiting resistors 184a, 184b and 184c and the trip contacts 96-1, when the system is deactivated.

Charging circuit transformer 152 has an additional secondary winding 170a which develops a voltage generally proportional to the voltage on the charging capacitor bank, but of substantially smaller magnitude, and this voltage is supplied via leads 163a and 163b to the variable autotransformer 165 of the adjustable overvoltage circuit 46, shown in FIG. 2, which is thereby adjustably raised in magnitude, and triggers the fault logic 61 (FIG. 4) if excessive The additional secondary winding 170a is closely coupled to the secondary winding 170 so as to indicate the rate of flux change of the latter, and thereby provide the aforementioned voltage level indication.

A voltage divider and meter circuit 188 is connected across the capacitor-charging supply lead 178 to grounded lead 180, and provides a voltage indication on lead 190 of the energy level of the capacitor bank in a continuous manner. This is supplied to the sensing logic 55, illustrated in FIG. 4. More specifically, the voltage divider reference circuit is formed, as shown, by resistors 191, 192 and 194. A storing meter circuit comprising a panel meter 196, resistors 193 and 195, diode 199 and peaking capacitor 197, is provided for indicating the charge buildup on the capacitor bank, the peaking capacitor 197 being connected from the cathode of the diode to ground 180. Resistor 195 is variable and is adjusted to calibrate the meter 196.

A further circuit branch is connected from the capacitor-charging supply lead 178 to the grounded lead 180, and provides for the derivation of an energizing signal for a "bank charged" indicator lamp 189 on the indicator panel 65, shown in FIG. 4. More particularly, a pair of series-connected protective gas lamps 198 and a current-limiting resistor 200, are connected across the capacitor-charging supply lead 178 to ground, and a lamp driver amplifier 202 has its input connected to the junction therebetween. The output of the driver 202 is connected directly to the "bank charged" indicator lamp 189 via lead 203. The opposite side of the indicator lamp 189 (FIG. 4) is connected directly to a DC potential as shown. Consequently, as the capacitor bank 22 begins to charge, the voltage across the resistor 200 begins to rise and the "bank charged" indicator lamp 189 lights. The protective gas lamps 198 prevent the large capacitor bank voltages from appearing across this circuit, in the event that the lead between the amplifier 202 and resistor 200 is disconnected.

The secondary winding 170 of the charging circuit transformer 152 is further connected to a second full wave rectifier bridge 204 in parallel with the rectifier bridge 176 and has its positive terminal connected to pilot ignitron supply lead 206 and its negative terminal connected to a further ground or common lead 208. The pilot supply lead 206 applies a positive potential to the plate of the main pilot ignitrons 32 and charges the pilot fire or sustaining capacitor 210 through a current limiting resistor 212 so that a positive charge (having the polarity as shown in FIG. 3) is developed across the fire capacitor 210. The pilot ignitron 32 of course is normally nonconductive. Additionally, the pilot supply lead 206 applies a positive potential to the plate of auxiliary pilot ignitron 43 and also charges the auxiliary pilot fire or sustaining capacitor 216 (with the polarity as shown in FIG. 3) through the forward biased diode 218 and a current limiting resistor 220.

Auxiliary pilot ignitron 43 is also normally nonconductive. The ignitor thereof is struck at the same time that the main pilot ignitron 32 is fired by the normal operation of the system. In this connection, the trigger circuit 34 for the main pilot ignitron 32 is energized upon activation of the control system by the transformer 98 (FIG. 1) which has its secondary winding connected via leads 100 and 102 to full-wave bridge rectifier 222 (FIG. 3). Rectifier 222 has its positive terminal connected to trigger supply lead 224 and its negative terminal to trigger supply lead 226. These leads are connected across a trigger storage capacitor 230 through a current-limiting resistor 228 to charge the capacitor 230 with the polarity shown in FIG. 3. The series combination of a silicon-controlled rectifier (SCR) 36, the primary of a trigger transformer 232 and a current-limiting resistor 234 are connected across the trigger storage capacitor 230 so as to apply a positive voltage to the anode of the SCR and a negative voltage to its cathode. A reverse-biased controlled avalanche type diode 236 is connected across the anode and cathode of the SCR to protect this device against excessive forward and reverse voltages.

The secondary winding of the trigger transformer 232 is connected directly to the ignitor of the main pilot ignitron 32 which has its cathode connected to the ignitors of the main ignitrons 30a, 30b and 30c through respective resistors 238a, 238b and 238c, as well as to the ignitor of the auxiliary pilot ignitron 43 through resistor 240. Consequently, when the SCR 36 receives a firing signal at its control or gate electrode through lead 242 from the fire logic 57 of FIG. 4, the SCR 36 becomes conductive, permitting the trigger capacitor 230 to discharge through the primary of the trigger transformer 232, causing a voltage pulse on the ignitor of main pilot ignitron 32 to cause the same to become conductive. This permits the fire capacitor 210 to discharge through the main pilot ignitron 32 and produces a firing pulse on the ignitors of each of the main ignitrons 30, firing the same, as well as on the ignitor of the auxiliary pilot ignitron 43. The auxiliary pilot ignitron 43 then becomes conductive, and auxiliary fire capacitor 216 discharges therethrough to produce a firing pulse on the ignitrons 37 through firing resistors 233 connected in series with each ignitor. This places the antiringing ignitrons 37 in an enabled or standby condition so that they are then set for operation, but such operation or conduction does not take place due to their reverse polarity connection, until ringing or current reversal actually begins to take place in the load 10, as will be hereinafter described in detail.

A protective gas lamp 281 is connected between the cathode of the pilot ignitron 32, through a resistor 283, and the activation control circuit supply lead 56 (FIG. 2) via lead 285 so as to prevent excessive voltages from appearing on lead 287 connected to the junction of the protective lamp 281 and the resistor 283 in the event lead 287 is disconnected. Lead 287 provides a FIRE-indicating signal to the protective logic 40 in FIG. 4 so that it can monitor the operations of the system, as previously mentioned.

When the main ignitrons 30a, 30b and 30c become conductive from the firing pulse of the pilot ignitron 32, each of the capacitors 24a, 24b and 24c discharge through the main ignitrons through the grounded bus 33, the load 10 and back through the return bus 35. Since the bus 33 is connected directly to ground, this is the zero reference, and a large initially negative voltage thus appears across the load 10. When, for example, the load 10 comprises a magnetic forming work coil, the voltage across the work coil is shown as 260 in FIG. 6a and the current through the work coil is shown as 262 in FIG. 6b. The capacitor voltage is substantially constant prior to the firing of the main ignitrons 30 at time equal $T_o$. After the main ignitrons are fired at time equal $T_o$, the capacitor bank voltage decreases to substantially zero at time equal $T_1$. The voltage across the work coil 10 at $t_o$ of high negative value and decreases to zero at approximately $T_1$, as the capacitor bank is discharged, but after which it begins to increase in the positive direction due to the capacitance and inductance in the circuit. Absent the antiringing means 38 connected across the work coil 10, the voltage 260 would oscillate and exponentially diminish in amplitude as indicated by the dotted line 260'.

Figure 6:
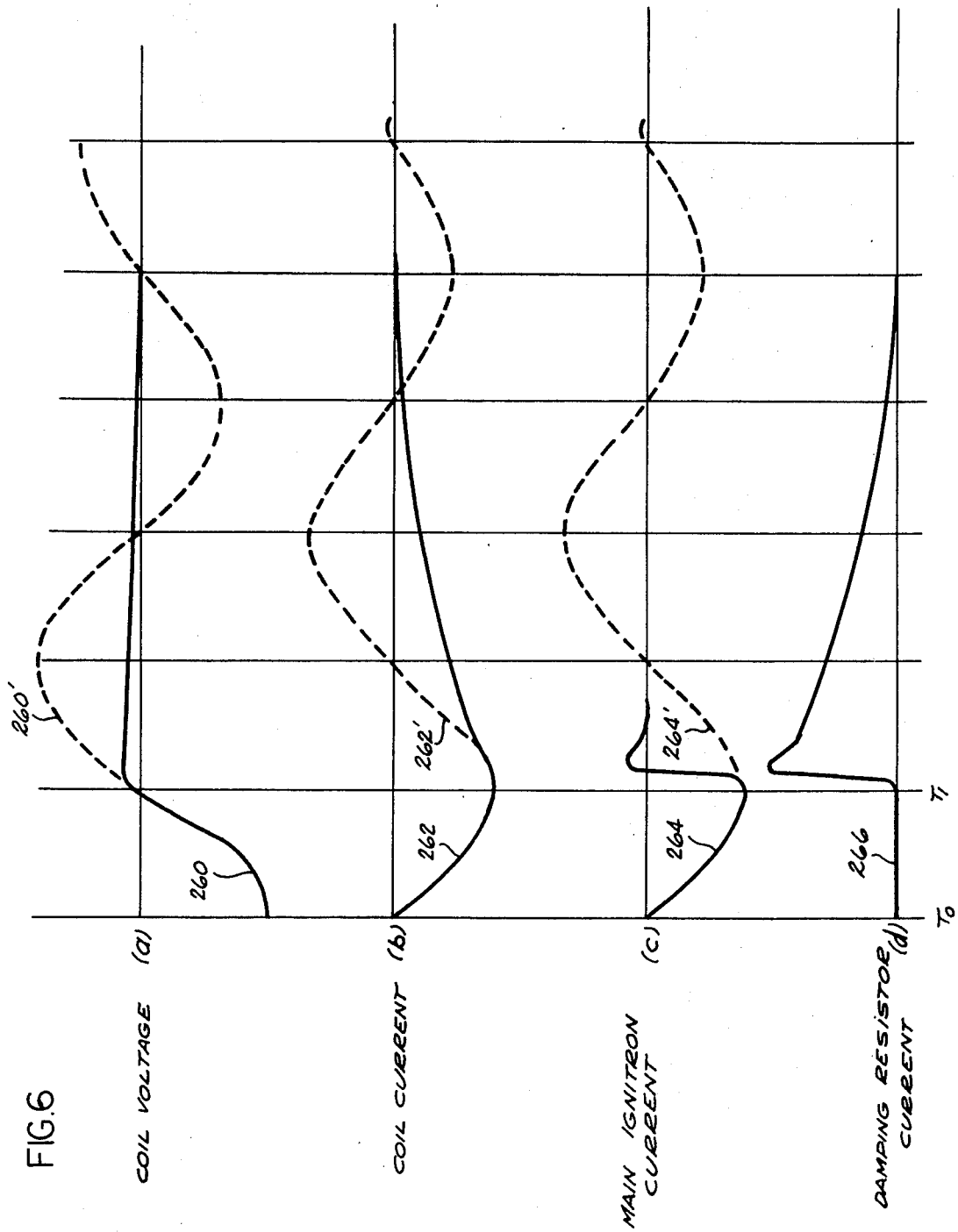
FIG. 6 is a graphical representation showing the voltage and current wave forms occurring, and tending to occur, across the work coil and capacitor bank of the embodiment of FIGS. 1 through 4.

Considering the current 262 flowing through the work coil, as shown in FIG. 6b, at time equal $T_o$, this current begins to flow from the capacitor bank, increasing in the negative direction. The current 262 reaches its maximum amplitude at approximately $T_1$, or at approximately zero voltage, and then decreases in amplitude. Like the voltage 260, absent the antiringing means 38, the current would oscillate and exponentially diminish in amplitude, as indicated by the dotted line 262', flowing through the main ignitrons and fouling their operation as shown by 264' in FIG. 6c.

However, as previously described, the auxiliary ignitrons 37 of the antiringing means 38 were previously enabled the auxiliary pilot ignitron 43 by applying a firing potential to the ignitor of each of the anitringing ignitrons 37, at about the same time (or just after) the main ignitrons 30 were fired, but because the antiringing ignitrons are connected with a polarity opposite to that of the main ignitrons 30, they are maintained nonconductive during the initial discharge of the capacitor bank since a negative voltage is then being applied to each of their plates while their cathodes are maintained at ground potential. As the voltage 260 across the work coil decreases in amplitude, passes through zero and increases in the positive direction, the plates of the antiringing ignitrons 37 have a positive polarity applied thereto with respect to their cathodes, and effectively short out the ringing current through the power dissipating damping resistors 41a and 41b as shown by 266 in FIG. 6d.

Consequently, the maximum amplitude of the reverse or positive voltage across the work coil, and across the bus bars 33 and 35, is substantially reduced as compared with its peak value without the anitringing means 38, as shown in FIG. 6a. For example, in a particular construction in accordance with the present embodiment of the invention, the maximum or peak reverse voltage developed across the work coil was reduced from approximately 3,800 volts (or about 85 percent of the peak forward voltage) to approximately 100 to 500 volts by employment of the antiringing means described. The current reversal or oscillation is also prevented in the main ignitrons 30 as shown by 264 in FIG. 6c, and the current rapidly decays from its maximum or peak value, being dissipated primarily through the resistors 41a and 41b, a preferred construction of which will hereinafter be described. The substantial prevention and rapid dissipation of reverse voltages and currents materially aid in permitting rapid pulsing of the work coil, as well as substantially increasing the useful life of the ignitrons employed. For example, pulse rates of about 3 to 10 per second may be produced by the presently described system, while the main ignitrons have an operating life permitting practical an economical industrial application, such as in the 100 million cycle range.

Figure 5:
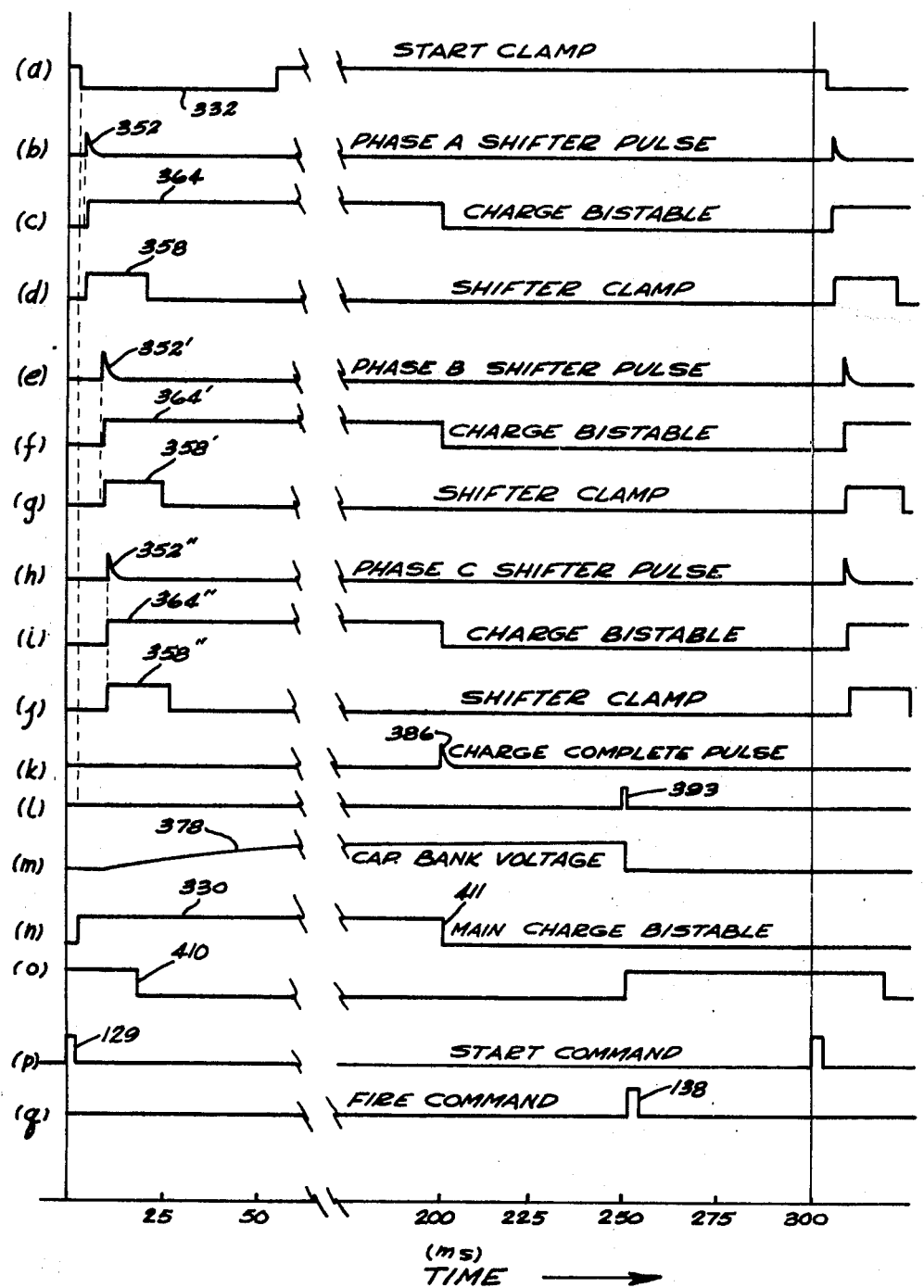
FIG. 5 is a graphical representation of the wave form at various points in the system of FIGS. 1 through 4 to illustrate the operation thereof.

Turning now to a detailed description of the logic circuitry illustrated in FIG. 4, which is represented by symbology and conventions of the so-called "JIC code" for logic and control systems, and with reference to the wave forms illustrated in FIG. 5, a START command signal pulse 129 (FIG. 5p) is transmitted from the START command input circuit 21 (FIG. 2) to the charge start-stop logic 45 via lead 47 to begin the charging cycle wherein the capacitor charging means 26 causes the storage capacitor means 22 to accumulate a charge thereon. The charging cycle continues until the charge start-stop logic 45 receives a CHARGE COMPLETE signal from the sensing logic 55 which indicates that the stored energy accumulation in the storage-capacitor means 22 has reached the predetermined or preselected reference value. The capacitor-changing means 26 is controlled by the phase control line-switching logics 49, 51 and 53 which are, in turn, controlled by a charge start-stop signal from the charge start-stop logic 45 via lead 304, which is parallely connected to each of the phase control line-switching logics by leads 306 and 308. The start-stop logic 45 is also coupled to the FIRE logic 57 through lead 310 to inhibit the operation of the FIRE logic 57 until the storage capacitor means 22 has reached the preselected energy level or charge. The start-stop logic 45 supplies a further output via lead 312 to a "charging" indicator lamp 314 which forms a part of the indicator panel 65 and is lighted during the charging cycle.

More particularly, the charged start-stop logic 45 comprises a main charge bistable circuit 316 having its set input coupled to the start command lead 47 and its reset input connected to the output of the sensing logic 55 and to the manual reset from the manual reset circuit of FIG. 2 so as to be responsive to the READY signal and to the manual reset signal via lead 302. The principal output of the bistable 316 is coupled to the input of a long time constant monostable multivibrator circuit, referred to hereafter as the start clamp 317, which comprises a bistable or flip-flop circuit 318, a NOT logic 320 and a time delay energizing circuit 322. The principal output of the main charge bistable 316 is connected to the set input of the bistable 318 which has its principal output connected directly to the input of the NOT logic 320, and the output thereof is connected to the time delay circuit 322 which supplies an output pulse after a predetermined time has elapsed to the reset input of the bistable 318 to reset this circuit. The output of the start clamp 317 is taken from the complementary output of the bistable 318 on lead 304. The start clamp output on lead 304 is fed to the phase control line-switching logics 49, 51 and 53 by means of parallel interconnections 306 and 308. The complementary output of the main charge bistable 316 is also connected to the phase control line-switching logics via lead 324 and parallel interconnections 326 and 328.

The charge start-stop logic 45 operates in response to the start command pulse 129 (FIG. 5p) which causes the principal output of the main charge bistable 316 to be placed in its "1" condition and its complementary output on lead 324 to be placed in its "0" condition. The "1" condition main charge bistable output illustrated as pulse 330 in FIG. 5n, and is fed to the "charging" indicator 314 through a lamp driver amplifier 332 via lead 312, to the start clamp 317, and to the fire logic 57 via lead 310. The start clamp output on lead 304 is initiated concurrently with the main charge bistable pulse 330, but terminates automatically at a predetermined time as controlled by the time delay circuit 322 of the start clamp 371. The main charge bistable pulse 330 serves as a clamping or inhibit signal to the fire logic 57, and as an indicator signal for the "charging" lamp 314.

The main charge bistable 316 is placed in its reset condition by either a CHARGE COMPLETE signal from the sensing logic 55 or by a manual reset signal, but in either case, the main charge bistable pulse 330 then terminates, cutting off the "charging" indicator lamp 314 and removing the clamping signal from the FIRE logic 57. In addition, the complementary output of the main charge bistable 316 goes to its "1" condition.

The charge start-stop logic 45 controls the operation of the phase controlled line-switching logics 49, 51 and 53 through its output leads 304 and 324. Each of the line-switching logics 49, 51 and 53 comprise substantially the same components, and thus it is only necessary to describe line-switching logic 53 in detail, the corresponding components of line-switching logics 51 and 49 being respectively indicated with the same reference numerals primed (') and double primed ("). The function of line-switching logic 53 is to control the capacitor charging circuit 26 so that the charging transformer 148 associated with phase A from the three-phase source, supplied charging current only when the phase A voltage is at its peak, and to prevent its charging when the phase A voltage is at zero so that high current surges are prevented in the charging transformer 148. The line-switching logic 53 has four inputs 334, 336, 338 and 340 and one output lead 183. The output of the line-switching logic 53 on lead 183 provides the trigger signal for the SCR 160 in the AC switching circuit 154 that is serially connected in the primary winding of the charging transformer 148. The other line-switching logics 49 and 51 serve the same function with respect to phases B and C, respectively, and provide corresponding outputs on leads 185 and 187 to the SCRs 162 and 164 in the AC switching circuits 156 and 158, respectively. The outputs from each of the line-switching logics are suitably delayed by phase shifters therein so that they correspond, in time, with the occurrence of the peak voltage points in each of the voltage phases of the source applied to the capacitor-charging transformers 148, 150 and 152. The appropriate phase voltage is supplied to each of the line-switching logics from the phase separating transformers 140, 142 and 144 (FIG. 1) through leads 177, 179 and 181, to serve as phase separating transformers 140, references for the line-switching logics.

In particular, lead 177 is connected to the input lead 334 and supplies the phase reference for controlling he capacitor charging transformer 148 through the AC switch 154. This AC signal is suitably converted by a signal converter circuit 342 to produce a DC output corresponding to the zero crossing of the phase A AC signal on input 334, which is amplified by amplifiers 344 and 346, and fed to an input and the output of a NOR logic 348. The output of the NOR logic 348 is fed to a time delay circuit 350 which provides an energizing phase shifter pulse 352 at its output 354, as shown in FIG. 5b.

The energizing phase shifter pulse 352 is delayed a period of time corresponding to 90° in phase form the zero crossing of the phase A-voltage by the time delay circuit 350 so that the phase A shifter pulse 352 occurs when the phase A AC line voltage is at its peak value. This pulse actuates a shifter clamp monostable multivibrator 356 which produces a clamping pulse 358 shown in FIG. 5d which is fed to the second input of the NOR logic 348 so that only one output pulse 352 is generated by the time delay circuit 350 for the duration of the pulse. The phase A shifter pulse 352 is also fed through a gate 360, to the set input of the phase A charge bistable circuit 362. The phase A bistable circuit 362 generates pulse output 364, as shown in FIG. 5c, form its principal output terminal and maintains a "1" condition until the charge bistable 362 is reset by a suitable signal to its reset terminal The charge bistable pulse 364 is fed through an amplifier 366 and then to the gate electrode of the SCR 160 (FIG. 3) via lead 183. The SCR 160, which is in the AC switch 154, thus becomes conductive when the voltage to the charging transformer 148 is at its peak instantaneous value.

The start clamp pulse 332 on lead 304 is fed to the input lead 340 which is connected to the control terminal of the gate 360 and maintains this gate open for the predetermined duration of the pulse, after which the gate 360 closes. The duration of the start clamp pulse 332, and thus the time which the gate remains open, is selected to permit the activation of the phase A charge bistable 362 by a sufficient number of AC cycles to assure reliable operation, but not so long as to reasonably permit inadvertent commencement of the charging cycle. The duration of the pulse 332 in the present embodiment is typically approximately 50 milliseconds, which permits at least three pulses before the gate 360 will be switched off or closed.

Line-switching logics 51 and 49 operate in the same manner except that the phase B shifter pulse 352' (FIG. 5e) occurs when the phase B AC line voltage is at 90°, and triggers the phase B charge bistable 362' at this time, the time delay circuit 350' being clamped by the monostable multivibrator pulse 358' (FIG. 5g) in the same manner as discussed in connection with line-switching logic 53. The phase B-charge bistable pulse 364' (FIG. 5f) is thus initiated concurrently with the phase B-shifter pulse 352', as shown, to provide an output on lead 185 to SCR 162 in switch 156 (FIG. 3).

Also, with respect to the line-switching logic 49, the phase C-shifter pulse 352" (FIG. 5h) occurs when the phase C-line voltage is at 90° and actuates the phase C-charge bistable 362" to produce the pulse 364" (FIG. 5i) fed to the output lead 187, the output of the time delay circuit 350" being clamped by the monostable multivibrator pulse 358" (FIG. 5j) The output lead 187 is coupled to SCR 164 in switch 158 (FIG. 3).

The capacitor charging transformers 148, 150 and 152 are thus controlled in the above manner to supply a DC charging current on supply lead 178 from each respective rectifier bridge 172, 174 and 176. As this charging cycle continues, an increasing DC potential is developed on voltage divider lead 190 which is indicative of the increasing energy level of the capacitor bank. This is shown by the increasing capacitor bank voltage 378 in FIG. 5m. This potential, or a potential proportional thereto, is registered on the peaking meter 196 suitably displayed on the control panel of the apparatus, and the potential on the voltage divider lead 190 is applied to a first input of the sensing logic 55. A preselected reference potential is determined by adjustment of the potentiometer 130 (FIG. 2) of the reference voltage circuit 123, the potentiometer 130 being calibrated so as to permit selection of the level or amount of charge on the capacitor bank which will be discharged to the load upon receiving the FIRE command signal. This reference potential is brought via lead 134 to a second input of the sensing logic 55. Both the reference potential and the capacitor charging potential are compared in a voltage comparator circuit 380 which produces a signal output when the capacitor charging voltage reaches the reference potential. This output signal is fed to a monostable multivibrator circuit 382 which, inn turn, generates a square pulse which is differentiated by a signal converter 384 to produce a precise CHARGE COMPLETE signal 386, shown in FIG. 5k. The CHARGE COMPLETE signal 386 is fed to the reset input of the main charge bistable 316, which then resets or changes the state of this bistable circuit, as shown in FIG. 5n.

Upon receiving the CHARGE COMPLETE signal 386, the principal output of the main charge bistable 316 switches to its "0" condition as shown by the trailing edge 411 of pulse 330 illustrated in FIG. 5n, and the complementary output is switched to the "1" condition which signal is supplied via lead 324 and interconnecting leads 326 and 328, to the reset inputs of each of the line-switching logic bistables 362, 362' and 362". These bistables are then all simultaneously switched to their reset condition, switching the principal output of each to its "0" condition, as shown in FIG. 5c, f and i, and thus removing the trigger potentials on leads 183, 185 and 187 to each of the SCR's in the capacitor charging circuit 26. This stops the charging cycle of the capacitor bank which will then maintain its charge at substantially the preselected reference value. The system is then ready to fire the main ignitrons 30.

During the charging cycle the "bank charged" indicator lamp 189 on the indicator panel 65 (FIG. 4) was lighted, as previously described, by the driver signal on lead 203 (FIG. 3) near the beginning of the charging cycle. Also, at the beginning of the charging cycle the "charging" indicator lamp 314 was lighted by the driver signal on lead 312, controlled by the principal output of the main charge bistable 316. When the charging cycle is over, as described above, the "charging" indicator 314 goes off since it is driven by the main charge bistable 316, but the "bank charged" indicator 189 remains on, since it is driven by a potential derived from the actual charge on the capacitor bank.

Upon transmission of a fire command pulse 138 (FIG. 5q) on lead 59, the fire bistable 388 receives this signal at its set input. This produces a "1" output at its principal output terminal which is fed through a gate 390 to trigger SCR firing monostable multivibrator 392, which generates the fire trigger pulse 393 shown in FIG. 5L. The main charge bistable pulse 330 (being supplied on lead 310) is fed to the control terminal of the gate 390 via leads 398 and 400 so that the gate 390 is open only when the capacitor bank is not charging; or in other words, the SCR firing monostable 392 may only be actuated when the main charge bistable 316 is in its reset condition. This prevents the main ignitrons 30 (FIG. 3) from prematurely discharging the capacitor bank through the work coil or load. The main charge bistable pulse 330 is also fed to the input of the time delay circuit 394 through clamping gate 396 connected between the principal output of the fire bistable 388 and the input of the delay circuit 394. Thus, after a FIRE command pulse 138 is received at the set input of the fire bistable 388, this circuit retains its "1" condition until a short time after the main charge bistable goes into its set or "1" condition, at which time the fire bistable 388 is reset, as shown by the falling pulse edge 410 in FIG. 5 o. Although a FIRE command pulse 138 received at this time would then switch the fire bistable 388, the SCR firing monostable could not be actuated until the fire gate 390 is opened at the time corresponding to the trailing edge 411 (FIG. 5n) of the main in charge bistable pulse 330, signifying that the capacitor bank has reached the preselected energy level. When the fire bistable has been reset, the output of gate logic 396 maintains it in this condition even though the main charging bistable 316 has returned to its reset or "0" condition.

The complementary output of the fire bistable 388 is fed through an amplifier 402 and an appropriate signal converter circuit 404 to lead 107 which is coupled to the fire cycle counter 105 in FIG. 1, the fire cycle counter 105 being triggered with each FIRE command signal 138 so as to maintain a register of the total number of fire cycles.

The output of the fire monostable multivibrator 392 is a square pulse coupled via lead 242 to the SCR 36 connected in the trigger circuit 34, as previously discussed.

Considering now the protective logic circuit 40, this circuit receives an input signal 330 (FIG. 5n) via lead 400 from the principal output of the main charge bistable 316, a further input via lead 287 from the cathode of the pilot ignitron 32 indicative of the main and auxiliary pilot ignitrons being fired, and a clamping and reset signal from the activation control circuit of FIG. 1. More particularly, the protective logic circuit 40 comprises a protective bistable circuit 408 having its set input coupled to the main charge bistable principal output on lead 400 through a suitable signal converter 412, such as a differentiator, and the pilot ignitron firing signal is coupled to the reset input of the protective bistable 408 via lead 287 through a suitable signal converter 409, such as an integrator or filter. The principal output of the bistable 408 is coupled to a first NOT logic 414 and the complementary output of the bistable 408 is coupled to a second NOT logic 415. The output of the first and second NOT logics 414 and 415 are respectively coupled to time delay energizing circuits 416 and 418 which each normally produce an output pulse at a predetermined time after being actuated or unclamped. This output pulse, coupled through OR gate 419, then forms the protective logic output on lead 420 which is coupled to an input of the fault logic 61.

The clamping and reset signal on lead 109 from the activation control circuit of FIG. 1 is coupled through two respective signal converters 422 and 424, which may be conventional rectifiers and filters, to the input of each respective NOT o logic 414 and 415.

In operation, when the line-disconnect switch 15 (FIG. 1) is closed but the system is not activated, the reset and clamping signal is supplied on lead 109 from the activation control circuit supply lead 58 through the normally closed primary control relay contact 74–4 (FIG. 1). This clamping and reset signal, which is an AC voltage, is rectified and filtered by converter circuits 422 and 424, thus applying a "1" logic condition on each of the NOT logics 414 and 415 which applies a "0" logic condition on each of the time delay energizing circuits 416 and 418 to maintain them in a clamped or reset condition. This prevents them from initiating a timing operation, which would eventually result in an output on the protective logic output lead 420.

Upon activation of the system by depressing the activate switch of FIG. 1, the primary control relay is energized, opening the normally closed contact set 74–4, which removes the clamping AC signal from lead 109. At the same time, the protective logic bistable 408 is in its reset condition, and thus has a "0" principal output and a "1" complementary output. Thus the output of the NOT logic 414 is "1" and the output of NOT logic 415 is "0." The "1" output of NOT logic 414 permits the time delay energizing circuit 416 to begin its timing operation. If nothing more occurs, a protective logic pulse on lead 420 will be supplied to the fault logic 61. However, in normal operation, within the predetermined time delay of delay circuit 416 a START command signal will be supplied on lead 47 and the main charge bistable pulse 330 (FIG. 5n) will be supplied to the set input of the protective logic bistable 408. This will place the protective logic bistable 408 in its set condition, so that it supplies a "1" principal output and a "0" complementary output, respectively, to each of the NOT logics 414 and 415. The output of the NOT logic 414 is then "0" which again clamps and resets the time delay energizing circuit 416, while the output of the NOT logic 415 is now "1," which unclamps or starts the time delay energizing circuit 418 to generate an output pulse at a second predetermined tim if nothing further occurs. However, upon receiving the FIRE command signal on lead 59 and the occurrence of the firing of the pilot ignitrons (and consequently the main ignitrons), a pulse is supplied from the cathode of the pilot ignitron 32 (FIG. 3) through a resistor 283 via lead 287 to the reset input of the protective logic bistable 408. This places the bistable 408 in its reset condition wherein a "0" principal output is supplied to the NOT logic 414 and a "1" complementary output is supplied to the NOT logic 415. The time delay circuit 418 is thus clamped and reset and the time delay circuit 416 is once again initiated.

This operation continues each time the system is run through the capacitor charging and firing cycles until either a START command is not received within a first predetermined time from the activation of the system or a FIRE command is not received within a second predetermined tie after the START command is received. In either case, an output signal is generated on the protective logic output lead 420 which actuates the fault logic 61, in the manner described below to indicate that either a NO-START or NO-FIRE condition exists.

Fault logic 61 comprises a first bistable 430 having its principal output fed to a diverging two-branch circuit wherein one branch comprises a lamp driver amplifier 432, the output of which is coupled to a "no-start no-fire" indicator lamp 434 which forms a part of the indicator panel 65. The other branch comprises a driver amplifier 436, the output from which is coupled through the deactivating winding 63a of the deactivation control relay 63 to ground or common on lead 438. The deactivation relay 63 is of the type having a set winding 63a and a reset winding 63b, and maintaining each condition until the other winding is energized. A second bistable 440 has its principal output coupled to two further driver amplifiers 442 and 443, the output of driver 442 being coupled to an "overvoltage" indicator lamp 444 on the indicator panel 65, and the output of driver 443 being coupled to the deactivation relay winding 63a through an OR logic 445. Three AC signals are supplied to the fault logic 61 from the activation control circuit 20 of FIG. 2, and these are the reset lead 171 from the reset switch 169, the overvoltage signal lead 159 from the overvoltage test switch 155 and the overvoltage circuit 46, and the manual stop lead 157 from the manual stop switch 153. Each of these AC signal inputs to the fault logic 61 is fed through signal converters 446, 448 and 450, respectively, which convert each off the AC signals to DC by rectificaton. The overvoltage DC from converter 448 is supplied to a voltage threshold device such as a series connected Zener diode 449 so that an output signal is produced only when the input potential is greater than the threshold level. The reset signal output of converter 446 is coupled to the reset input of the first bistable 430, to the reset input of the second bistable 440 and to one side of the reset coil 63b of the system deactivation control relay 63, the other side of the reset coil 63b being connected to the ground lead 438. The OVERVOLTAGE signal from the overvoltage Zener diode 449 is supplied directly to the set input of the second bistable circuit 440. The manual STOP signal from the converter 450 is fed through OR logic 445 to the ungrounded side of the deactivating winding 63a of the system deactivation control relay 63.

In operation, assuming that all circuits of the fault logic 61 have been previously reset and that the deactivation control relay 63 is latched in its reset position, upon receiving a protective logic output signal or pulse on lead 420 at the set input of the first bistable 430, the principal output thereof switches to its "1" condition, which lights the "no-start no-fire" indicator lamp 434, signifying that either there was a failure to start the charging cycle within the predetermined time set for starting (measured from the time of system activation) or that there was a failure of the ignitrons to fire within the predetermined time set for such firing (measured from the beginning of the charging cycle). In addition, the "1" principal output from the first bistable 430 is applied to the deactivating control relay winding 63a, deactivating the control system by opening the normally closed switch contacts 63–1 (FIG. 1) which opens the activating branch 69 of the activation control circuit 20 and thereby deenergizes the primary or activation control relay 74 which opens branch 97 to remove power from the trigger circuit 34 (FIG. 3). This also opens branch 93 to deenergize the trip vacuum relay 96 which causes the trip contacts 96–1 (FIG. 3) to close, shorting out the charging circuit 26 and the capacitor bank 22. Thus any charge remaining on the capacitor bank is discharged. The opening of branch 93 of the activation control circuit 20 also deenergizes the trip contactor relay 104 which opens the three-pole line contacts 104–1, removing the three-phase power source from the control system with the exception of the activation control circuit, itself, which still has power applied thereto. The normally closed primary or activation relay contact 74–4 closes and applies a clamping and reset signal via lead 109 to the protective logic 40 to reset and maintain the time delay energizing circuits 416 and 418 in their clamped and reset condition.

Additionally, upon energization of the deactivating control relay winding 63a, the normally open contacts 63–2 (FIG. 1) are closed, which lights the "fault" indicator lamp 106 and supplies an AC reset signal on lead 1100 to the phase control line-switching logics 49, 51 and 53 to reset the charge bistables 362", 362" and 362 after being converted to DC by converters 339", 339' and 339, and coupled to the reset input of each of these respective bistable circuits.

In this condition of the control system, the "main power" indicator lamp 62 and the "control power" indicator lamp 66 are lighted as well as the "interlock" lamp 84. Also, the "-fault" indicator lamp 106 is lighted, and the operator may then refer to the indicator panel 65 whereat the "no-start no-fire" indicator lamp 434 will be lighted.

The OVERVOLTAGE signal on lead 159 fed to the fault logic 61 is generated as previously described in connection with the overvoltage reference circuit 46 (FIG 2) and the overvoltage test switch 155. As regards the overvoltage reference circuit 46, the voltage on lead 159 has a preselected proportionally constant with respect to the voltage level or energy level of the capacitor bank (selected by means of the adjustable autotransformer 165). This signal is rectified, and when it has exceeded the threshold of the Zener 449, a pulse supplied to switch the second fault bistable circuit 440 at its set input, producing a "1" principal output therefrom which is amplified by the driver amplifier 442 to light the "overvoltage" indicator lamp 44, and in addition thereto, is amplified by the driver amplifier 443 which energizes the system-deactivating control relay winding 63a, deactivating the system in the same manner as described above. The threshold voltage and the voltages produced by the charging transformer secondary winding 170a and the autotransformer 165 are appropriately correlated with the reference circuit 123 to provide the desired relationship between the reference voltage and the excess or overvoltage required to produce a fault indication.

The manual STOP AC signal on lead 157 which is fed to the fault logic 61 is initiated by momentarily closing the stop switch 153 (FIG. 2) when the test switch 151 is in its closed position. Thus, this STOP signal may be used during the test or setup operation of the system to cause deactivation thereof. The manual operation signal on lead 157 is rectified and applied through OR logic 445 to the deactivating control relay winding 63a.

The normal system deactivation or stopping is achieved by momentarily depressing the stop switch 72 in the activation control circuit branch 69 (FIG. 1) which also deactivates the system in the manner above described, but without lighting the "fault" indicator lamp 106 and without energizing the system deactivation control relay 63, since the energizing circuit of the activation or primary control relay 74 is broken directly by the stop switch 72. Deactivation of the control system by the fault logic 61 will always result in the lighting of the "fault" indicator lamp 106 as can be seen. The manual reset switch 169 (FIG. 2) which is located in the activation control circuit 20 may be employed to generate a manual RESET pulse which is transmitted via lead 171 to the fault logic 61 to reset the first and second bistable circuits 430 and 440, and to reset the deactivation control relay 63 by passing a rectified current through the reset winding 63b. Thus, the momentary actuation of the reset switch 169 resets the fault logic 61, closing the deactivation control relay contact 63-1 and opening the deactivation control relay contact 63-2 to turn off the "fault" indicator lamp 106 and to remove the reset signal on lead 110 to the line switching logics 49, 51 and 53. Actuation of the reset switch 169 also causes a DC pulse to be supplied from the rectifier and filter circuit 173 (FIG. 2) to the reset input of the main charge bistable 316 in the charge start-stop logic 45 to assure that the logic 45 is in condition to receive a subsequent START command signal.

In accordance with the above-described operation of the entire control system, and particularly in connection with the operation of the antiringing means 38, as shown in FIG. 3, the dissipation of the reverse or ringing current produced by the inductive and capacitive effects of the circuit and load is achieved by the discharge of this current through the improved damping resistors 41a and 41b. The improved construction of these resistors provides extremely good heat dissipation, the ability to withstand the physical shock created by the high-current surges therethrough, and a low inductance to permit the conduction and dissipation of these current surges in extremely rapid succession or at high pulse frequencies. A resistor construction in accordance with this aspect of the invention is illustrated in FIGS. 7 and 8.

Figure 7:
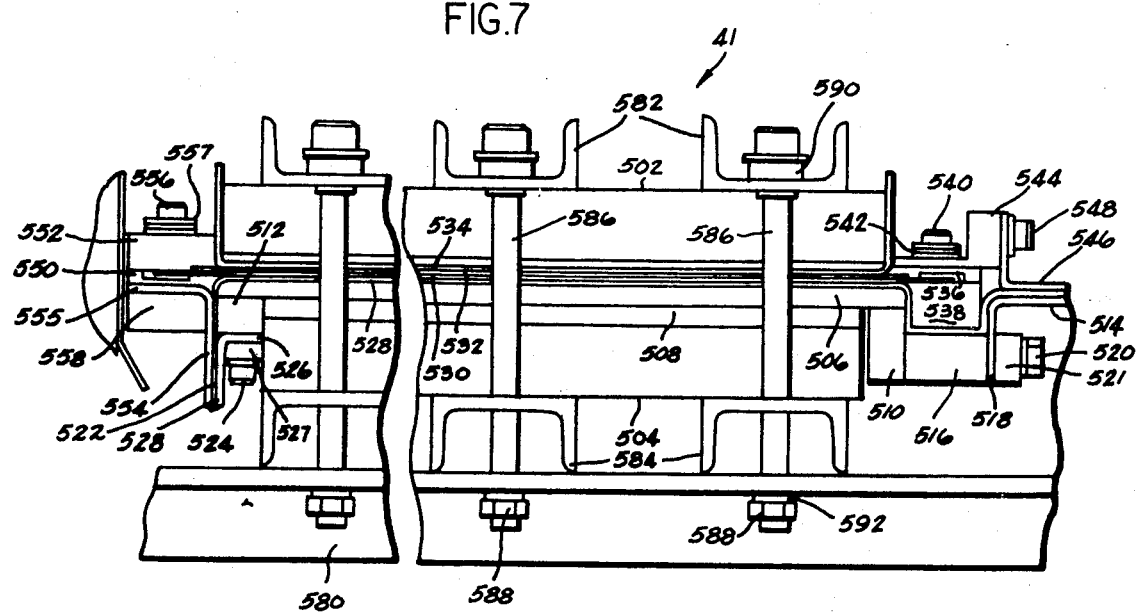
FIG. 7 is an elevational view showing a resistor construction in accordance with a feature of the present embodiment of the invention.
Figure 8:
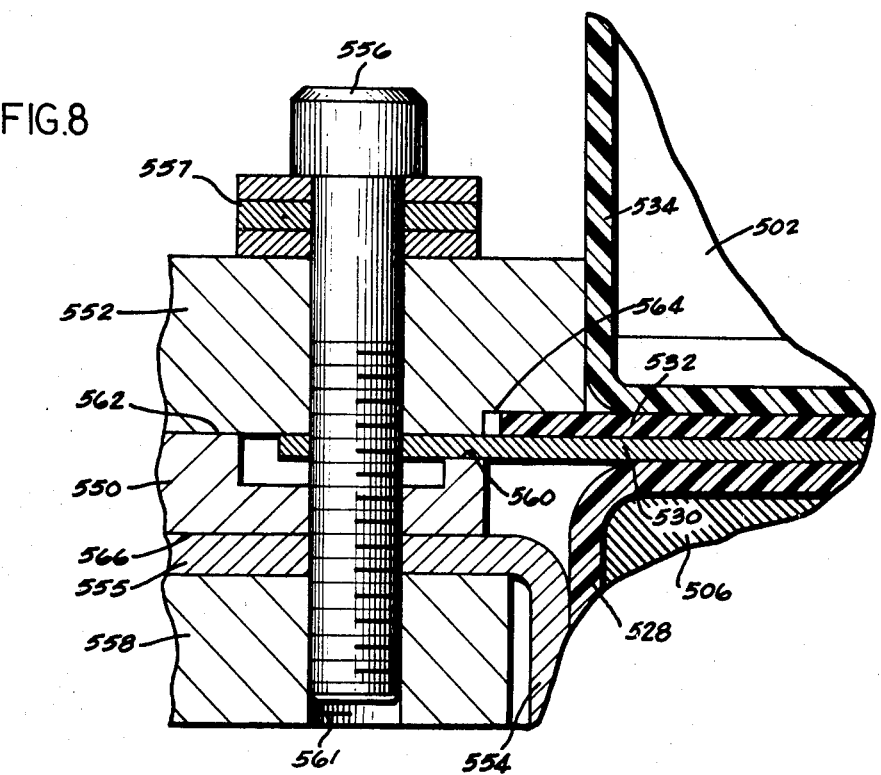
FIG. 8 is an enlarged sectional view of a portion of the construction shown in FIG. 7.

Referring now to FIG. 7, there is shown the resistor construction 41 including its associated terminal and supporting structure. The structure generally includes top and bottom metal or insulating clamping plates 502 and 504 respectively, each of the clamping plates being rigid and of substantial strength and defining a space therebetween. A resistor return bus bar 506, formed of copper, or other such low-resistiviity metal, and being relatively thick, is disposed within this space adjacent a cooling means or member 508 which is interposed between the resistor return bus 506 and the bottom clamping plate 504. The resistor return bus 506 has its end portions fastened by any suitable means to downwardly extending bar positions 510 and 512, respectively. The downwardly extending bar portion 510 is electrically connected to the common or transmission return bus 514 through a conductive inner clamping bar 516 which is interposed between the downwardly extending bar portion 510 and a downwardly extending tab portion 518 of the transmission return bus 514 by means of bolts 520, which pass through an outer clamping bar 521 disposed under the head of the bolts, to secure and clamp these parts together. Each of the conductive bars are suitably apertured to receive the bolts 520, which include bolts parallel to and behind the bolt shown in the drawing and are thus not visible in the drawing. The apertures in bar 510 are threaded to receive the ends of these bolts, which are secured therein.

At the other end of the resistor return bus 506, the downwardly extending bar portion 512 is connected to the other transmission return bus 522 by means of bolts 524 which clamp the tab portion 526 of the return bus 522 to the resistor return bus 506 through an outer conductive clamping bar 527 which is disposed between the head of the bolts 524 and the tab 526.

A layer of insulation 528 is placed over the resistor return bus 506 and its associated conductive parts. At the right end (as shown in FIG. 7) of the resistor return bus 506, the layer of insulation 528 is brought downwardly over the downwardly extending bar 510, horizontally over the clamping bar 516, and then up and over the transmission return bus 514. At the left end, the insulation 528 is brought downwardly, over and adjacent the other transmission return bus 522.

The resistor 41 preferably includes a titanium resistance element or plate 530, which may typically be about 0.010" thick, and two layers of insulation 532 and 534 which are disposed thereover, the upper insulating layer 534 being brought upwardly at its end portions along the opposite ends of the top clamping plate 502.

The right end of the titanium resistance element is disposed under a resistor clamp 536 which clamps the titanium resistor element 530 between it and a conductive resistor clamping bar 538 by means of bolt 540 (and others behind and parallel to it) which is inserted through a bellowable washer 542 and an elongated brass shoulder lug 544, and screwed into the resistor clamping bar 538. The terminal to the resistor element 530 is formed by the elongated brass shoulder lug 544 which is disposed between the upper portion of the resistor clamp 536 and the bellowable washer 542, and has a suitable aperture therein for the bolt 540. The mounting or upright portion of the terminal lug 544 is screwed to the ungrounded or "hot" transmission bus 546 by means of a bolt 548 and suitable washers (together with other such bolts parallel and behind bolt 548, and not visible in the drawing).

At the left side of the assembly, the titanium resistance element 530 is clamped between a further resistor clamp 550 and a conductive resistor bar 552. The other hot transmission bus 554 has a tab portion 555 clamped against the resistor clamp 550 by means of a bolt 556 which is inserted through a bellowable washer 557 and screwed into a further conductive bar 558, as shown in greater detail in the partial sectional view of FIG. 8.

Referring to FIG. 8, the titanium resistance element 530 is shown having its left end portion clamped by the resistor clamp 550 at a region defined by the upwardly extending flat portion 560. The area of contact with the titanium resistance element 530 is thus determined by the lateral width (i.e., from left to right in FIG. 8) and the length (i.e., measured perpendicular to the plane of the drawing) of the surface 560. The clamping bar 552 is disposed over the clamping member 550 and rests on the opposite raised flat portion 562 thereof, the height of this raised portion 562 being at the height of the upper surface of the titanium resistance element 530. The clamping bar 552 has a recess 564 in its lower right surface which receives the insulation 532, but preferably does not extend to the left beyond the area corresponding to the surface 560, as shown, so that the titanium element 530 is clamped against a metal surface on both sides within this area. The hot transmission bus 554 extends upwardly and is bent laterally to form tab 555 so as to abut the lower face 566 of the resistor clamp 550. The block 558 has threaded apertures 561 therein which receive the ends of the bolts 556 and other bolts therebehind (not shown), and extends to the right preferably under or beyond the area corresponding to surface 560 for good clamping action. A bellowable washer 557 is disposed between the head of the bolt 556 and the upper surface of the bar 552. The bar 552, which receives the clamping bolts such as 556 through apertures therein, is preferably composed of brass.

The resistor or resistance element clamp 536 is similar to clamp 550, having the same raised flat surface portion as 560 of the latter; but in the former clamp 536, it is directed downward to contact a rectangular area on the upper surface of the resistance element 530, whereas the portion 560 of the clamp 550 is directed upward to contact a like area on the lower surface of the resistance element 530. Both of the resistance element clamps 536 and 550 are made of hard drawn copper and are machined on all surfaces. The particular shape of each of these clamps provide high interface pressures, since the end portions of the resistance element 530 are driven against the clamps 536 and 550 with an extremely high force over a relatively small area. The bolts which provide the clamping forces, such as bolts 540 and 556, are tightened to provide sufficient force to prevent sparking from high current density and to cause the copper of the resistance element clamps 536 and 550 to flow so that the connections will withstand the thermal expansion produced by the high-current surges through the resistor. The bars 538 and 558 receive the clamping bolts on each respective end of the resistor, and are preferably composed of steel having ground surfaces. The clamping bolts may be spaced transversely on each end of the resistor at one inch intervals.

The sheets of insulation 528, 532, and 534 have a laminated or sandwich structure, and are each formed of a 3 mil layer of Teflon interposed between two 1 mil layers of Kapton film, Kapton being a DuPont trade name for a high-temperature insulation having a high dielectric strength. Thus, each insulation sheet is only about 5 mils thick, and this thinness provides high thermal conduction to the clamping plates 502 and 504. As shown in FIG. 8, two layers of insulation 532 and 534 are disposed between the titanium resistance element 530 and the top clamping plate 502, providing a thickness of only about 10 mils; however, in some instances only one layer of insulation need be employed, depending on the maximum potential developed on the resistance element 530. But in any event, the least number of layers are used having sufficient bulk resistance and dielectric strength to withstand the potentials involved. The insulation sheets 528, 532 and 534 are coated with a film of silicone grease to prevent corona and to increase the insulating properties further.

As shown in FIG. 7, the resistor 41 is mounted on a steel frame 580 which may form a part of the overall support structure of the apparatus, and in the present structure, is a pair of angle irons of which only one is visible in the drawing. Channels 582 and 584, having a generally square "U"-shape cross section, are disposed transversely across the top and bottom of the resistor assembly, and serve to clamp the entire assembly together by means of bolts 586 which extend through apertures inn the channels and are fastened to nuts 588 under the frame 580, as shown. The bolts 586 are located so as to straddle the resistor assembly, and are fitted with suitable bushings 590 and washers 592 at the top and bottom, respectively, and the entire resistor structure 41 is held tightly to the frame 580 in this manner.

It is desirable that the titanium resistance element and the resistor return bus be of relatively large area, and may, for example, be approximately 2 feet square and generally coextensive with each other. The particular length and width of the resistance element may be determined by the resistance desired, being in the form of a plate to minimize its inductance. As an additional factor to minimize inductance and internal stresses in the structure, the copper return bus is provided also in the form of a plate (but of generally large thickness for minimum resistance) and positioned closely adjacent the titanium resistance element.

The return copper bus 506 may form a part of the grounded bus 33 in FIG. 3 so that when the reverse current is discharged through the resistors 41, i.e., through the titanium plate 530, a current surge is being conducted in the opposite direction in the copper return plate 506, the fields from each tending to cancel the effects of the other.

When the reverse current surges are conducted through the resistor 41 at a rapid rate alternate with the firing of forward current surges through the work coil, the terminal connections and structure in accordance with this aspect of the invention maintains the integrity and reliability of the resistor as regards mechanical strength and electrical characteristics, and good cooling or heat transfer properties are also provided. Water cooling tubes may be brazed onto bus plate 506 and located in the space defined by member 508.

Other high-resistivity metals may be employed for the resistance element, but generally less advantageously. For example, stainless steel or a cobalt alloy such as is known under the trade name "Haynes Metal" may be used, but the former metal has a lower resistivity than titanium, while the latter metal is substantially more expensive. The use of titanium is preferred as compared to other metals even though it has a relatively low density (and consequently a low mass for any given size element) and a value of specific heat which is fairly typical of metals generally, rather than a high density and high specific heat which would probably be normally expected or thought necessary for a high-current surge resistance element. The desirable results from the use of titanium as the high-resistance metal are believed due to, at least in part, its relatively low coefficient of thermal expansion.

As can now be seen, an improved control system has been disclosed for controlling the production of high magnitude current pulses to a load, and especially to one of an inductive nature such as a work coil for magnetic pulse forming, at very high pulse rates. Antiringing means and an improved high-current, low-inductance, power-damping resistor eliminate current reversals in the main ignitron switches, reducing coil heating, capacitor heating, and extending the useful operating life of the power components to the 100 million cycle range.

An electronic control logic system controls the charging operation of a high energy capacitor bank in such a manner as to continuously charge the bank from a multiphase source without generating current surges that would create excessive stresses in the charging transformers and permits the charging cycle to commence for only a predetermined time after a suitable START command signal is received, and should the charging cycle fail to commence during this predetermined time, then it is prevented from subsequently commencing until the system is reset. The electronic logic system also prevents the pulsing of the load until a preselected charge level has been attained on the capacitor bank, and additionally deactivates the system if the charging cycle fails to start within a first predetermined time after the system is activated, or the firing cycle fails to occur within a second predetermined time after the charging cycle starts, or an overvoltage develops on the capacitor bank.

In addition, trigger and pilot-switching circuits are provided for firing the switching ignitrons from the low-energy logic signals in a reliable and efficient manner.

These are, inter alia, general features and advantages of the present invention, and others of the features and advantages have been described in detail herein.

Although the present embodiment of the control system has been illustrated schematically and in block logic form, any number of particular circuit arrangements may be provided to perform these logic functions, and such arrangements, per se, are known to the art. As one example, the time delay energizing circuits employed in various logic circuits illustrated and described, may be formed by a conventional unijunction transistor circuit of the type having the emitter coupled to the junction of a series connected resistor and capacitor, in the manner well known in the art.

Although a preferred embodiment of the present invention is herein described, various modifications will be apparent to those skilled in the art based on the teachings hereof, both as regards the overall system and as regards particular features and aspects thereof. Accordingly, the scope of the invention should be defined only by the claims, and equivalents thereof.

Various features of the invention are recited in the following claims.

What is claimed is:

1. Apparatus for forming a workpiece comprising a load element for delivering high energy impulses to the workpiece and a control system for controlling the production of high-magnitude current pulses to the load element, said control system being adapted to be connected to an electrical power source and comprising high energy storage capacitor means, capacitor-charging means for regulating the energy buildup on said capacitor means from said source, a main ignition connected between said capacitor means and the load element and being normally nonconductive to prevent discharge of said capacitor means to the load, means for selectively causing said main ignitron to become conductive to discharge said capacitor means to the load element, and antiringing means comprising an auxiliary ignitron connected in series with resistance means, said series combination being connected across said main ignitron and capacitor means, and said auxiliary ignition being connected with opposite polarity to that initially on said main ignitron, so that the occurrence of significant reverse voltages across said main ignitron is prevented and reverse currents therethrough are eliminated.

2. Apparatus for forming a workpiece comprising a load element for delivering high-energy impulses to the workpiece and a control system for controlling the production of high-magnitude current pulses to the load element, said control system being adapted to be connected to an electrical power source and comprising high-energy storage capacitor means, capacitor-charging means for regulating the energy buildup on said capacitor means from said source, a main ignitron connected between said capacitor means and the load element and being normally nonconductive to prevent discharge of said capacitor means to the load, means for selectively causing said main ignitron to become conductive to discharge said capacitor means to the load element, and antiringing means coupled to said main ignitron and the load for preventing the occurrence of significant reverse voltages across said main ignitron and the elimination of reverse currents therethrough, said electrical power source being of the AC multiphase type, and said capacitor charging means comprising circuit means including a transformer associated with each phase of said source, a controllable switching means serially interconnected in said circuit means in the input of each transformer, and control means for making each of said controllable switching means conductive at the peak voltage points and nonconductive at the zero voltage points of the respective AC phase applied to the transformers from said multiphase source.

3. A control system for controlling the production of high-magnitude current pulses to a load, and being adapted to be connected to an electrical power source, comprising high-energy storage capacitor means, capacitor-charging means for regulating the energy buildup on said capacitor means from said source, main switching means connected between said capacitor means and the load, and being normally nonconductive to prevent discharge of said capacitor means to the load, normally nonconductive pilot-switching means coupled to said main switching means for activation thereof to a conductive condition to discharge said capacitor means to the load, and trigger circuit means coupled to said pilot-switching means to render the same conductive in response to a given low-energy signal, said main switching means comprising a plurality of ignitrons each connected in series with said capacitor means and the series combinations connected in parallel with the load, said pilot-switching means comprising a further ignitron having its cathode coupled to the ignitors of each of said plurality of primary ignitrons and a normally positively charged capacitor coupled to its plate, and said trigger circuit means comprising a trigger transformer having its secondary winding coupled to the ignitor of said pilot ignitron, a thyristor serially connected with the primary winding of said trigger transformer and a DC source, and the control electrode of said thyristor being adapted to receive said given signal.

4. A control system for controlling the production of high-magnitude current pulses to a load, and being adapted to be connected to an electrical power source, comprising high-energy storage capacitor means, capacitor charging means for regulating the energy buildup on said capacitor means from said source, main switching means connected between said capacitor means and the load, and being normally nonconductive to prevent discharge of said capacitor means to the load, normally nonconductive pilot-switching means coupled to said main switching means for activation thereof to a conductive condition to discharge said capacitor means to the load, trigger circuit means coupled to said pilot-switching means to render the same conductive in response to a given low energy signal, said main switching means comprising a plurality of ignitrons each connected in series with said capacitor means and the series combinations connected in parallel with the load, said pilot switching means comprising a further ignitron having its cathode coupled to the ignitors of each of said plurality of primary ignitrons and a normally positively charged capacitor coupled to its plate, logic means responsive to the failure of said pilot ignitron to fire within a predetermined time after the charging of said capacitor means to deactivate the control system, and circuit means responsive to said logic means for discharging the capacitor means through a circuit path other than the load.

5. A control system for controlling the production of high-magnitude current pulses to a load, and being adapted to be connected to an electrical power source, comprising means for activating said system by applying the power source thereto, high-energy storage capacitor means, capacitor-charging means for regulating the energy buildup on said capacitor means from said source, main switching means connected between said capacitor means and the load and being normally nonconductive to prevent discharge of said capacitor means to the load, logic means including means responsive to a first command signal for causing said capacitor charging means to initiate said energy buildup and means responsive to a second command signal for causing said main switching means to become conductive to discharge the stored energy of said capacitor means to the load, and means responsive to said main switching means becoming conductive for providing an output signal indicative thereof, said logic means including protective means having means for deactivating said control system in the event that said first command signal fails to occur within a predetermined time after said system is activated, means for deactivating said control system in the event that said second command signal fails to occur within a second predetermined time after said first command signal, and means responsive to said output signal for deactivating said system in the event said output signal fails to occur within a given predetermined time interval.

6. A control system for controlling the production of high-magnitude current pulses to a load, and being adapted to be connected to an electrical power source, comprising means for activating said system by applying the power source thereto, high-energy storage capacitor means, capacitor-charging means for regulating the energy buildup on said capacitor means from said source, main switching means connected between said capacitor means and the load and being normally nonconductive to prevent discharge of said capacitor means to the load, logic means including means responsive to a first command signal for causing said capacitor charging means to initiate said energy buildup and means responsive to a second command signal for causing said main switching means to become conductive to discharge the stored energy of said capacitor means to the load, sensing means responsive to the energy level of said capacitor means for providing an output indicative of the energy level therein reaching a preselected value, and means responsive to said sensing means output for effecting discontinuance of said energy buildup on said capacitor means, said logic means including protective means having means for deactivating said control system in the event that said first command signal fails to occur within a predetermined time after said system is activated and means for deactivating said control system in the event that said second command signal fails to occur within a second predetermined time after said first command signal.

7. A control system for controlling the production of high-magnitude current pulses to a load, and being adapted to be connected to an electrical power source, comprising means for activating said system by applying the power source thereto, high-energy storage capacitor means, capacitor-charging means for regulating the energy buildup on said capacitor means from said source, main switching means connected between said capacitor means and the load and being normally nonconductive to prevent discharge of said capacitor means to the load, and logic means including means responsive to a first command signal for causing said capacitor-charging means to initiate said energy buildup and means responsive to a second command signal for causing said main switching means to become conductive to discharge the stored energy of said capacitor means to the load, said logic means including protective means having means for deactivating said control system in the event that said first command signal fails to occur within a predetermined time after said system is activated, means for deactivating said control system in the event that said second command signal fails to occur within a second predetermined time after said first command signal, and means for inhibiting said main switching means from becoming conductive until the energy level of said capacitor means has reached a preselected value even upon prior receipt of said second command signal.

8. The control system of claim 6 further comprising further means for sensing the energy level of said capacitor means, and means for deactivating said system in the event that said energy level is greater than a second preselected value determined independently of said first mentioned preselected value.

9. The control system of claim 7 wherein said means for inhibiting includes means for comparing the voltage on said capacitor means to a preselected reference voltage and means to provide a signal indicative of whether the capacitor voltage has attained a predetermined relation to the reference voltage, and gating means responsive to said last-mentioned signal to inhibit the normal action of said second command signal when the capacitor voltage has not attained said predetermined relation to the reference voltage, but permits said normal action of said second command signal when the capacitor voltage has attained said predetermined relation to said reference voltage.

10. A control system for controlling the production of high-magnitude current pulses to a load, and being adapted to be connected to an AC voltage source, comprising high-energy storage capacitor means, capacitor-charging means for regulating the energy buildup on said capacitor means from said AC source, main switching means connected between said capacitor means and the load, and being normally nonconductive to prevent discharge of said capacitor means to the load, said capacitor-charging means comprising circuit means including a transformer being connected at its input to said AC source and at its output to rectifier means coupled to said capacitor means, controllable switching means serially interconnected in said circuit means with said transformer for selectively permitting or preventing the flow of charging current to said capacitor means, and control means coupled to said controllable switching means for making the same conductive at the peak voltage points and nonconductive at the zero voltage points of the AC voltage from said source.

11. The control system of claim 10 wherein said controllable switching means is serially interconnected between the primary winding of said transformer and the AC source.

12. The control system of claim 10 wherein the AC power source is of the multiphase type, and said circuit means further includes a transformer associated with each phase of said source, a controllable switching means being serially interconnected in said circuit means in the input of each transformer and said control means making each of said controllable switching means conductive at the peak voltage points and nonconductive at the zero voltage points of the respective AC phase applied to the transformers from said source.

13. The control system of claim 12 wherein said control means comprises means responsive to a first command signal for providing an output pulse of a predetermined duration, line-switching means responsive to said output pulse and each of said phases of the AC source to provide parallel output turnon pulses phase-shifted 90° in respect to each of said AC phases during said predetermined duration, and means coupling said turnon pulses to each respective controllable switching means.

14. The control system of claim 13 wherein said predetermined duration output pulse is sufficiently long to ensure that at least one turnon pulse is generated for each controllable switching means in all respective phases of the AC source.

15. The control system of claim 13 wherein each of said line-switching means associated with each phase of the source comprises a phase shifter circuit for generating a short pulse 90° out of phase with the zero crossing of each respective AC phase, and clamping means to permit only one such short pulse to be produced in each of said line-switching means.

16. The control system of claim 15 wherein each of said line-switching means comprises a bistable circuit having its set input responsive to said short pulse of said phase shifter circuit, and a gate interposed in the circuit path therebetween, the control terminal of said gate being responsive to said output pulse of predetermined duration, whereby each of said bistable circuits may be set only during the time period of said predetermined duration.

17. The system of claim 13 wherein said first command-signal-responsive means comprises a bistable circuit having its set input adapted to receive said first command signal, a relatively long time constant monostable circuit being responsive to the principal output of said bistable circuit and providing said output pulse of predetermined duration, a further means responsive to a second command signal for initiating the firing cycle of said main switching means and including means responsive to the principal output of said bistable circuit to prevent said second command signal from initiating the firing cycle of said main switching means until after a preselected charge has been attained on said capacitor means.

18. The system of claim 17 further comprising adjustable reference means for preselecting the maximum energy level to be attained on said capacitor means, sensing means for deriving a signal indicative of the actual energy level on said capacitor means, and comparator means for comparing said derived signal with said reference to provide an output when the energy on said capacitor means attains said preselected reference value, the output of said comparator means being coupled to the reset input of said bistable means and the complimentary output is coupled to said line-switching means to stop the charging of said capacitor means.

19. The system of claim 18 further comprising protective means including a bistable circuit having one input responsive to said output pulse of predetermined duration and a second input responsive to the firing of said main switching means, first and second time delay energizing means for providing an output signal at predetermined times after their initiation, means interconnecting each output of said bistable circuit with one of said delay means to provide an output signal if said pulse of predetermined duration does not occur within the predetermined delay of said first delay means and to provide an output signal if said main switching means is not fired within the predetermined delay of said second delay means.

20. The system of claim 19 comprising means responsive to the output signal of said protective means for deactivating the control system on the occurrence thereof, and including means for providing an indication that the charging of the capacitor means failed to start or that the main switching means failed to fire.

21. The control system of claim 11 wherein said controllable switching means comprises a full wave rectifier bridge having a thyristor interconnected across the center thereof.

22. The system of claim 3 including logic means for generating said given signal, means coupling said given signal to the control electrode of said thyristor, said logic means including means for preventing the generation of said given signal during the charging of said capacitor means.

23. The apparatus of claim 1 further comprising an auxiliary pilot ignitron having its cathode coupled to the ignitor of said auxiliary ignitron and a normally positively charged capacitor being connected to its plate so that when said auxiliary pilot ignitron becomes conductive, said auxiliary ignitron will become conductive upon any voltage reversal developed thereacross.

24. The apparatus of claim 23 further comprising a pilot ignitron having its cathode coupled to the ignitor of said main ignitron and a normally positively charged capacitor coupled to its plate, mean coupling said pilot ignitron to the ignitor of said auxiliary pilot ignitron so that the latter becomes conductive on the triggering of the former.

25. The apparatus of claim 24 comprising trigger means coupled to the ignitor of said pilot ignition, said trigger means comprising a thyristor interconnected with a capacitor, means for charging said capacitor so that a trigger pulse is generated by said thyristor becoming conductive, and means for coupling the trigger pulse to the ignitor of said pilot ignitron.

26. The apparatus of claim 1 further comprising logic means responsive to given command signal for effecting the operation of said capacitor charging means and said main ignitron for the discharge of the stored energy to the load element in a predetermined manner, said logic means including protective means for automatically deactivating said system in the event that said system operation is other than in said predetermined manner.

27. The apparatus of claim 26 further comprising means for selectively activating said system by applying the power source thereto, said logic means including means responsive to a command signal for causing said capacitor charging means to initiate said energy buildup, and said protective means including means for deactivating said control system in the event that said command signal fails to occur within a predetermined time after said system is activated by said means for selectively activating said system.

28. The apparatus of claim 27 wherein said logic means comprises means responsive to a second command signal for causing said main ignitron to become conductive to discharge said capacitor means to the load element, said protective means including means for deactivating said control system in the event that said second command signal fails to occur within a predetermined time after said first command signal.

29. The apparatus of claim 2 wherein said control means comprises line-switching means responsive to a signal voltage corresponding to each of said phases of the source for providing parallel output turnon pulses phase shifted 90° in respect to each of said AC phases, and means coupling said turnon pulses to each respective controllable switching means.

30. The apparatus of claim 1 wherein said resistance means comprises a low inductive structure including a planar high-resistivity metal resistance element, a planar return conductor element, and a relatively thin insulating sheet interposed therebetween.

31. The apparatus of claim 30 wherein the high-resistivity metal is titanium.

32. The apparatus of claim 30 wherein said insulating sheet is a laminated structure comprising a film of Kapton, a layer of Teflon, and a further film of Kapton.

33. The apparatus of claim 30 wherein said resistance means further comprises a terminal connected to said resistance element and a copper clamping means connecting said resistance element to said terminal with a sufficiently high contact pressure to prevent sparking from high-current density and to cause the copper to flow so that the connection will withstand the thermal expansion produced by the high-current surges through said resistance means.

34. The apparatus of claim 31 wherein said resistance means further comprises rigid, relatively thick clamping plates disposed on opposite faces of the structure, a further relatively thin insulating sheet disposed between one of said clamping plates and said planar titanium resistance element, and fastening means extending from one clamping plate to the other for providing a rigid, low inductive structure.

UNITED STATES PATENT OFFICE
CERTIFICATE OF CORRECTION

Patent No. 3,611,103            Dated October 5, 1971

Inventor(s) Richard A. Ayers

It is certified that error appears in the above-identified patent and that said Letters Patent are hereby corrected as shown below:

Column 1, line 19 - for "swagging" read "swaging".
Column 3, line 28 - for "indicates" read "indicated".
Column 5, line 11 - for "cooperation" read "or operation";
         line 44 - before "points" insert "zero-crossing, corresponding to the peak voltage";
         line 73 - for "as well a" read "as well as".
Column 6, line 31 - for "single" read "single-phase".
Column 7, line 35 - for "7-3" read "74-3".
Column 8, line 24 - for "wiper 1322" read "wiper 132".
Column 11, line 72 - after "on the" insert "ignitrons of each of the auxiliary or antiringing".
Column 12, line 29 - for "t₀ of high" read "T₀ is of a high".
Column 13, line 28 - for "changing" read "charging".
Column 14, line 23 - for "supplied" read "supplies";
         line 45 - after "phase" delete "separating transformers 140,".
Column 16, line 42 - for "main in charge" read "main charge".
Column 17, line 48 - for "tim" read "time";
         line 64 - for "tie" read "time".
Column 18, line 69 - for "1100" read "110";
         line 71 - for "362", 362" and 362" read "362", 362' and 362".
Column 19, line 10 - for "proportionally" read "proportionality";
         line 17 - for "44" read "444";
         line 33 - for "operation" read "STOP".
Column 25, line 2 - for "highaenergy" read "high energy".
Column 27, line 38 - for "mean" read "means".

Signed and sealed this 25th day of April 1972.

(SEAL)
Attest:

EDWARD M. FLETCHER, JR.          ROBERT GOTTSCHALK
Attesting Officer                   Commissioner of Patents